US010408515B2

(12) United States Patent
Bonifaccino

(10) Patent No.: US 10,408,515 B2
(45) Date of Patent: Sep. 10, 2019

(54) DIGITAL MONITORING AND MEASURING AIR CONDITIONER RECHARGING SYSTEM

(71) Applicant: Digi Charging Technology, LLC, Philadelphia, PA (US)

(72) Inventor: Marco Bonifaccino, Philadelphia, PA (US)

(73) Assignee: Digi Charging Technology, LLC, Philadelphia, PA (US)

( * ) Notice: Subject to any disclaimer, the term of this patent is extended or adjusted under 35 U.S.C. 154(b) by 53 days.

(21) Appl. No.: 15/475,415

(22) Filed: Mar. 31, 2017

(65) Prior Publication Data
US 2018/0010832 A1    Jan. 11, 2018

Related U.S. Application Data

(60) Provisional application No. 62/360,060, filed on Jul. 8, 2016.

(51) Int. Cl.
| | |
|---|---|
| *F25B 45/00* | (2006.01) |
| *B60H 1/00* | (2006.01) |
| *F24F 11/83* | (2018.01) |
| *F25B 49/00* | (2006.01) |
| *F24F 11/84* | (2018.01) |

(52) U.S. Cl.
CPC ......... *F25B 45/00* (2013.01); *B60H 1/00585* (2013.01); *F24F 11/83* (2018.01); *F25B 49/00* (2013.01); *F24F 11/84* (2018.01); *F25B 2345/001* (2013.01); *F25B 2345/002* (2013.01); *F25B 2345/003* (2013.01); *F25B 2500/19* (2013.01); *F25B 2500/23* (2013.01); *F25B 2500/24* (2013.01); *F25B 2700/1931* (2013.01); *F25B 2700/1933* (2013.01); *F25B 2700/2106* (2013.01); *F25B 2700/21173* (2013.01)

(58) Field of Classification Search
CPC ...... F25B 45/00; F25B 49/00; F25B 2500/19; F25B 2345/001; F25B 2345/003; F25B 2345/002; B60H 1/00585
See application file for complete search history.

(56) References Cited

U.S. PATENT DOCUMENTS

| | | | | |
|---|---|---|---|---|
| 4,967,567 A * | 11/1990 | Proctor | .............. | B60H 1/00585 62/127 |
| 6,571,566 B1 * | 6/2003 | Temple | ................. | F25B 49/005 62/127 |
| 9,366,465 B2 * | 6/2016 | McMasters | ............. | F25B 45/00 |
| 10,006,858 B2 * | 6/2018 | Hart | ....................... | G01N 21/53 |
| 2003/0158704 A1 * | 8/2003 | Triginai | ............. | B60H 1/00585 702/182 |
| 2005/0097904 A1 * | 5/2005 | Lifson | ..................... | F25B 45/00 62/149 |
| 2005/0262855 A1 * | 12/2005 | Hsieh | ................. | B60H 1/00585 62/126 |

(Continued)

*Primary Examiner* — Kun Kai Ma
(74) *Attorney, Agent, or Firm* — Duane Morris LLP

(57) ABSTRACT

A system for measuring and recharging an air conditioning system includes a vent sensor configured to be coupled to an outlet vent of an air conditioning system. The vent sensor is configured to measure at least one parameter of an air flow from the outlet vent. A processor is in signal communication with the vent sensor. The processor is configured to receive the at least one parameter of the air flow and determine a current refrigerant level of the air conditioning system.

18 Claims, 21 Drawing Sheets

(56) References Cited

U.S. PATENT DOCUMENTS

| | | | |
|---|---|---|---|
| 2006/0101834 A1* | 5/2006 | Govekar | B60H 1/00585 62/149 |
| 2006/0101835 A1* | 5/2006 | Meldahl | B60H 1/00585 62/149 |
| 2010/0089076 A1* | 4/2010 | Schuster | F25B 49/005 62/77 |
| 2015/0115047 A1 | 4/2015 | Okamoto et al. | |
| 2015/0159930 A1* | 6/2015 | McMasters | F25B 45/00 62/77 |
| 2015/0308879 A1* | 10/2015 | Pistone | F25B 45/00 73/292 |
| 2015/0380785 A1 | 12/2015 | Takeuchi et al. | |
| 2016/0003509 A1* | 1/2016 | Pistone | G01K 13/00 29/890.031 |
| 2016/0011059 A1* | 1/2016 | Quest | G01K 11/16 374/162 |
| 2016/0054021 A1 | 2/2016 | Lee et al. | |
| 2016/0061472 A1 | 3/2016 | Lee et al. | |
| 2016/0126026 A1 | 7/2016 | Denton | |
| 2016/0216717 A1 | 7/2016 | Elliott et al. | |
| 2017/0072769 A1* | 3/2017 | Quest | B60H 1/00585 |
| 2017/0100985 A1* | 4/2017 | Johnson | B60H 1/00978 |
| 2017/0113510 A1 | 4/2017 | Quest | |
| 2017/0198953 A1* | 7/2017 | Connell | F25B 13/00 |
| 2017/0232940 A1* | 8/2017 | Kuo | B60S 5/00 141/1 |

* cited by examiner

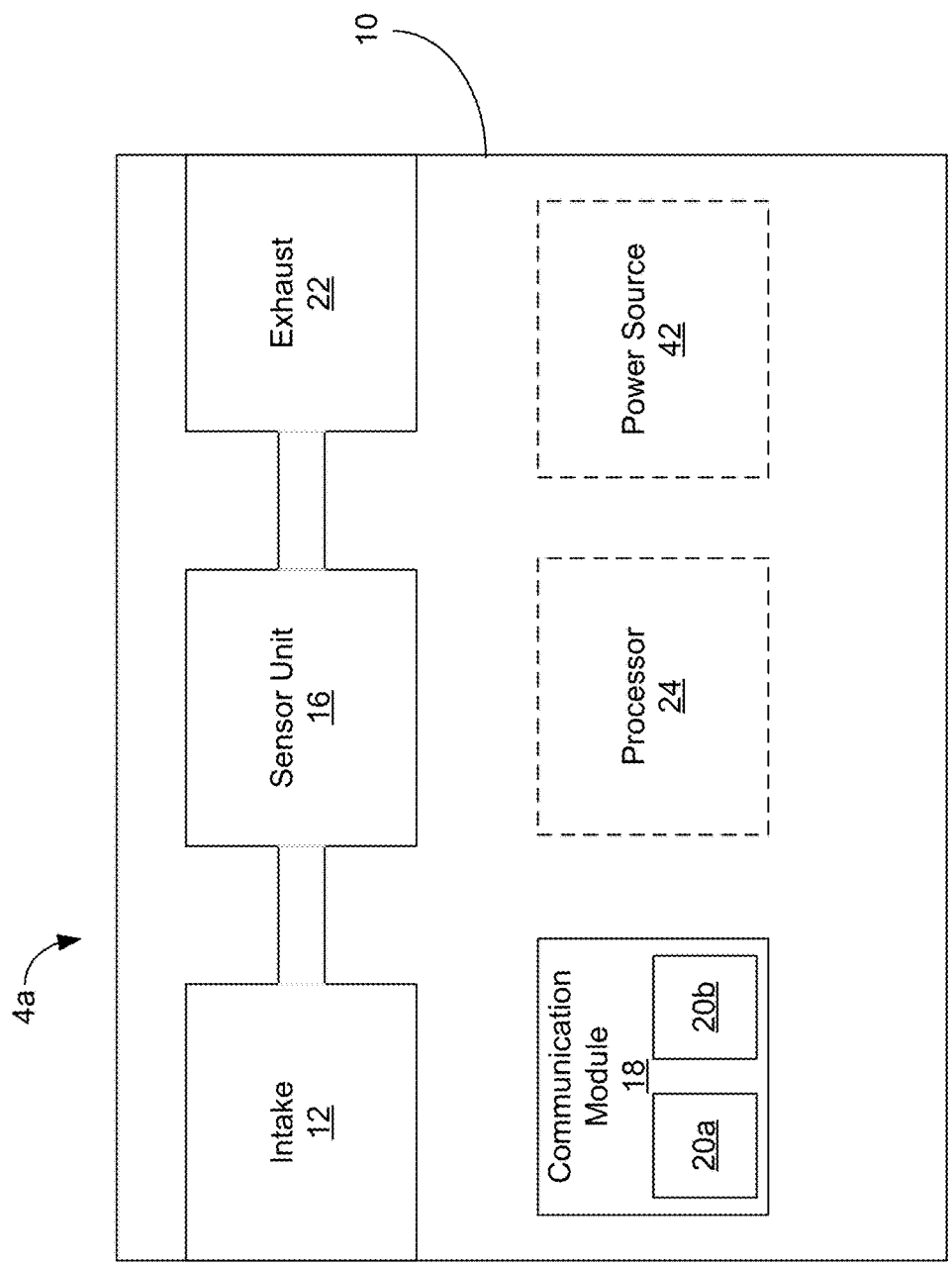

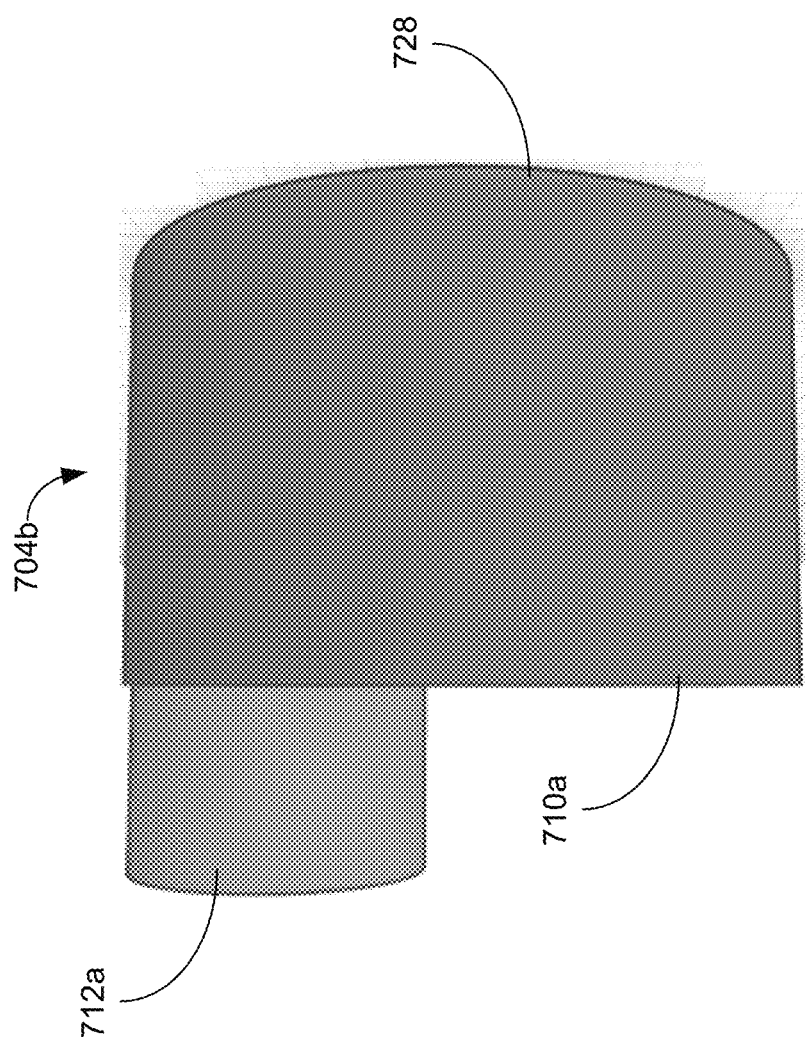

DIGITAL MONITORING AND MEASURING AIR CONDITIONER RECHARGING SYSTEM

CROSS-REFERENCE TO RELATED APPLICATION

This application claims priority to U.S. Provisional Application Ser. No. 62/360,060, filed Jul. 8, 2016, entitled "Digital air vent temperature-measuring Bluetooth/WiFi/Wireless device used to check and re-charge motor vehicles air conditioner," the disclosure of which is incorporated herein in its entirety.

FIELD OF THE INVENTION

This disclosure relates to systems for checking and recharging air conditioning systems. More particularly, this disclosure relates to systems for checking and recharging air conditioning systems including a refrigerant reservoir.

BACKGROUND

Inefficiencies in the quantity of refrigerant (too much or too little) is a major cause of compressor failure in air condition systems and can increase the energy cost for operating the air conditioning system, for example, increasing fuel use in a vehicle or electrical use in a structure. Running an air conditioning system on low refrigerant can result in compression failure due to low lubrication levels (delivered with refrigerant). Running an air conditioning system with too much refrigerant can result in compression failure due to blow out or other issues.

Recharging air conditioning systems, such as motor vehicle air conditioning systems, requires adding or removing refrigerant from a low pressure and/or high pressure sides of the air conditioning system. Most modern vehicle air conditioning systems are equipped with a thermal expansion valve and temperature sensor bulb which controls the rate of flow of liquid refrigerant into the evaporator (low pressure side) and which sets the maximum operating pressure. When recharging the low pressure and/or high pressure sides of a system, care must be taken not to overcharge the system and create potentially damaging or explosive situations.

BRIEF DESCRIPTION OF THE DRAWING

The features and advantages of the present invention will be more fully disclosed in, or rendered obvious by the following detailed description of the preferred embodiments, which are to be considered together with the accompanying drawings wherein like numbers refer to like parts and further wherein:

FIG. 2 illustrates a schematic diagram of a vent sensor, in accordance with some embodiments.

FIGS. 14A-14C illustrate a pressure sensor configured to couple to a low-pressure side and/or a high-pressure side of an air conditioning system, in accordance with some embodiments.

DETAILED DESCRIPTION

Figure 1:
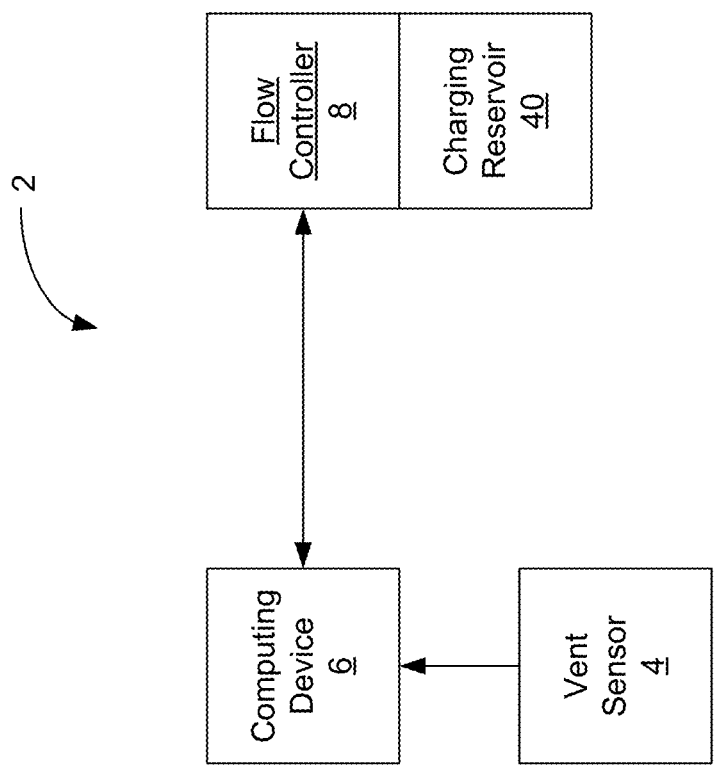
FIG. 1 illustrates a system for monitoring and performing a recharge operation of an air conditioning system including a vent sensor, in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

In various embodiments, a system for monitoring an air conditioning system and/or performing a recharge operation of the air conditioning system is disclosed. The system includes a vent sensor configured to couple to an outlet vent of the air conditioning system. The vent sensor is configured to receive air flow output from the air conditioning system and measure one or more parameters of the air flow. For example, in some embodiments, the vent sensor is configured to measure temperature of the air flow. The system further includes a computing device configured to receive a signal indicative of the one or more parameters of the air flow measured by the vent sensor. The computing device is configured to calculate and monitor the current refrigerant charge condition of the air conditioning system based on the one or more measured parameters and can be further configured to determine if the refrigerant charge status is above, below, and/or at optimal charge levels.

In some embodiments, the system includes a flow controller coupled to a refrigerant charging reservoir. The flow controller is configured to couple to a refrigerant reservoir of the air conditioning system. The flow controller is in signal communication with the computing device. The computing device controls the flow controller to adjust the refrigerant level of the air conditioning system. The computing device controls operation of the flow controller based on the one or more parameters of the air flow output measured by the vent sensor to increase and/or decrease the refrigerant charge level of the air conditioning system to an optimal level.

In various embodiments, a system for monitoring an air conditioning system and/or performing a recharge operation of the air conditioning system is disclosed. The system includes at least one pressure sensor configured to couple to a high-pressure side and/or a low-pressure side of the air conditioning system. The at least one pressure sensor is configured to receive refrigerant fluid flow from the air conditioning system and measure the pressure of the fluid flow. For example, in some embodiments, the pressure sensor is configured to measure the pressure level of a high-pressure and/or a low-pressure side of the air conditioning system. The system further includes a computing device configured to receive a signal indicative of the measured pressures. The computing device is configured to calculate and monitor the current refrigerant charge condition of the air conditioning system based on the measured pressures and can be further configured to adjust the refrigerant charge level of the air conditioning system.

In various embodiments, a system for monitoring an air conditioning system and/or performing a recharge operation of the air conditioning system is disclosed. The system includes a vent sensor configured to couple to an outlet vent of the air conditioning system and at least one pressure sensor configured to couple to a high-pressure side and/or a low-pressure side of the air conditioning system. The vent sensor is configured to receive air flow output from the air conditioning system and measure one or more parameters of the air flow. For example, in some embodiments, the vent sensor is configured to measure temperature of the air flow. The at least one pressure sensor is configured to receive refrigerant fluid flow from the air conditioning system and measure the pressure of the fluid flow. For example, in some embodiments, the pressure sensor is configured to measure the pressure level of a high-pressure and/or a low-pressure side of the air conditioning system. The system further includes a computing device configured to receive a signal indicative of the one or more parameters measured by the vent sensor and the at least one pressure sensor. The computing device is configured to calculate and monitor the current refrigerant charge condition of the air conditioning system based on the one or more measured parameters and can be further configured to adjust the refrigerant charge level of the air conditioning system.

FIG. 1 illustrates one embodiment of a system 2 for monitoring and recharging an air conditioning system, in accordance with some embodiments. The system 2 includes a vent sensor 4 and a computing device 6. The vent sensor 4 is configured to couple to an output vent of the air conditioning system (see, for example, FIG. 5A). The vent sensor 4 includes at least one intake configured to receive a portion of the air flow from the output vent. The vent sensor 4 receives the air flow and measures one or more parameters of the air flow. Measured parameters of the air flow can include, but are not limited to, temperature, pressure, humidity, etc.

In some embodiments, the vent sensor 4 is in signal communication with the computing device 6. For example, in some embodiments, the vent sensor 4 includes at least one circuit configured to transmit a signal indicative of the one or more measured parameters to the computing device 6. The vent sensor 4 can use any suitable communication protocol and/or medium, such as Bluetooth, WiFi, Near-Field Communication (NFC), TCP/IP, Ethernet, etc. to transmit the signal to the computing device 6, as discussed in more detail below. The computing device 6 is configured to receive the signal from the vent sensor 4 and perform one or more operations. It will be appreciated that the computing device 6 can include a processor and/or other circuit coupled to, embedded in, and/or remote from the vent sensor 4.

In some embodiments, the computing device 6 is configured to determine a refrigerant charge status of the air conditioning system based on the received one or more measured parameters. For example, in some embodiments, the one or more measured parameters include temperature of the output air flow. In such embodiments, the computing device 6 is configured to calculate a current charge status of the air conditioning unit based on the temperature of the air flow. The computing device 6 can be configured to determine whether the refrigerant in the air conditioning unit is too low, too high, or at optimal levels based on the measured parameters of the air flow. The computing device 6 may be configured to receive additional information to determine the charge status of the air conditioning system, such as information regarding ambient environmental conditions.

In some embodiments, the vent sensor 4 is configured to provide ambient environmental information to the computing device 6 prior to and/or after being coupled to the output air vent. For example, in some embodiments, the vent sensor 4 can be configured to measure and transmit parameters of the ambient environment around the air conditioning system, such as ambient temperature, ambient humidity, etc. to the computing device 6. In some embodiments, the vent sensor 4 includes a first sensor for measuring output air flow parameters and a second sensor for measuring ambient environmental information, although it will be appreciated that additional sensor can be included in the vent sensor 4.

In some embodiments, the computing device 6 is configured to calculate an optimal and/or desired charge state of the air conditioning unit and/or a current charge state. For example, the computing device 6 can be configured to determine if there is too much or too little refrigerant in the air conditioning unit (or a reservoir attached thereto). After determining the difference between the optimal charge and the current charge, the computing device 6 can be configured add and/or remove refrigerant from the air conditioning unit to reach the optimal calculated level. In some embodiments, the computing device 6 generates at least one of an audible, tactile, visual, electronic, and/or other some other indication to a user to indicate an increase and/or a decrease in the charge of the air conditioning system. In some embodiments, the computing device 6 operates a flow controller 8 in response to the calculated charge level.

In some embodiments, the system 2 includes a flow controller 8. The flow controller 8 is configured couple to a refrigerant charging reservoir 40 and to further couple to a refrigerant reservoir (see FIG. 5B) of the air conditioning unit. The flow controller is configured to control a flow rate of refrigerant from the charging reservoir 40 to the refrigerant reservoir. In some embodiments, the computing device 6 is in signal communication with the flow controller 8. The computing device 6 can transmit one or more control signals to the flow controller 8 to increase and/or decrease the amount of refrigerant in the refrigerant reservoir (e.g., add or remove refrigerant from the refrigerant reservoir). The flow controller 8 can include a one-way flow (refrigerant flowing from the charging reservoir 40 to the refrigerant reservoir) and/or a two-way flow (refrigerant flowing both directions).

FIG. 2 illustrates a schematic diagram of a vent sensor 4a, in accordance with some embodiments. The vent sensor 4a is similar to the vent sensor 4 discussed above, and similar description is not repeated herein. The vent sensor 4a is configured to be coupled to an output air vent of an air conditioning system. The vent sensor 4a receives air flow from the output vent through an intake 12 formed in a body 10 of the vent sensor 4a. The intake 12 is in fluid communication with at least one sensor unit 16. The sensor unit 16 includes one more circuits configured to measure at least one parameter of the air flow input, such as temperature, humidity, etc. provided through the intake 12. In some embodiments, the vent sensor 4a can include a plurality of sensor units 16 each configured to measure one or more parameters of the air flow.

The sensor unit 16 is electrically coupled to a communication module 18. The communication module 18 is configured to receive a signal indicative of the one or more measured parameters of the air flow input and transmit the signal to a remote device, such as the computing device 6. The communication module 18 can include a wired communication module 20a and/or a wireless communication module 20b. For example, in some embodiments, the communication module 18 can include a wired communication module 20a using one or more wired communication protocols, such as TCP/IP, UDP, Serial, Parallel, and/or any other suitable wired communication, as discussed in more detail below. As another example, in some embodiments, the communication module 18 can include a wireless communication module 20b using one or more wireless communication protocols, such as Bluetooth, NFC, RFID, WiFi, 802.11a/b/c/g, and/or any other suitable wireless communication protocol, as discussed in more detail below.

In some embodiments, the vent sensor 4a includes an exhaust 22 formed in the body to allow the air flow to be evacuated from the vent sensor 4a. The exhaust 22 is in fluid communication with the sensor unit 16. In some embodiments, the intake 12 and the exhaust 22 are positioned in-line, although it will be appreciated that the intake 12 and the exhaust 22 can be positioned at an off-set and/or at an angle with respect to each other. Although embodiments are illustrated herein including an intake 12, a sensor unit 16, a communication module 18, and an exhaust 22, it will be appreciated that the vent sensor 4a can include fewer, additional, and/or alternative elements to those illustrated herein and are within the scope of this disclosure, such as, for example, a power source 42, a processor 24, and/or any other suitable circuit or physical elements. In some embodiments, the exhaust 22 can be omitted and the intake 12 can serve as an intake/exhaust to allow air flow in and out of the body 10.

Figure 3B:
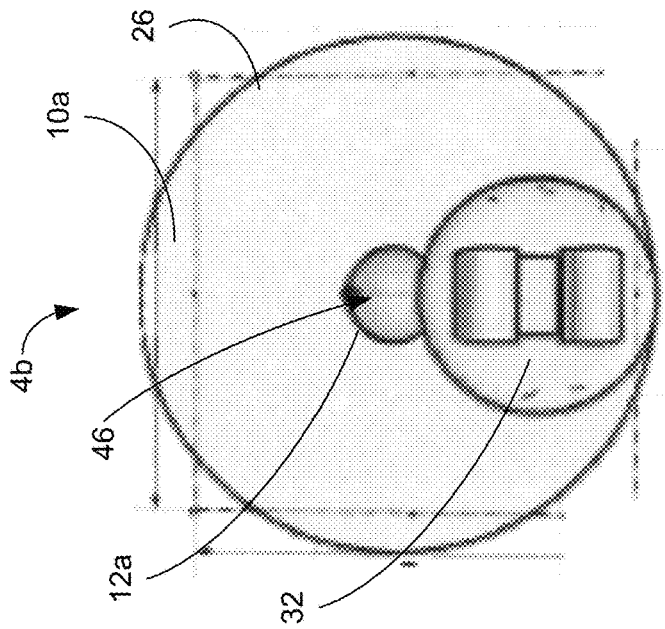
FIGS. 3A-3C illustrate a vent sensor configured to couple to an output vent of an air conditioning system, in accordance with some embodiments.
Figure 3A:
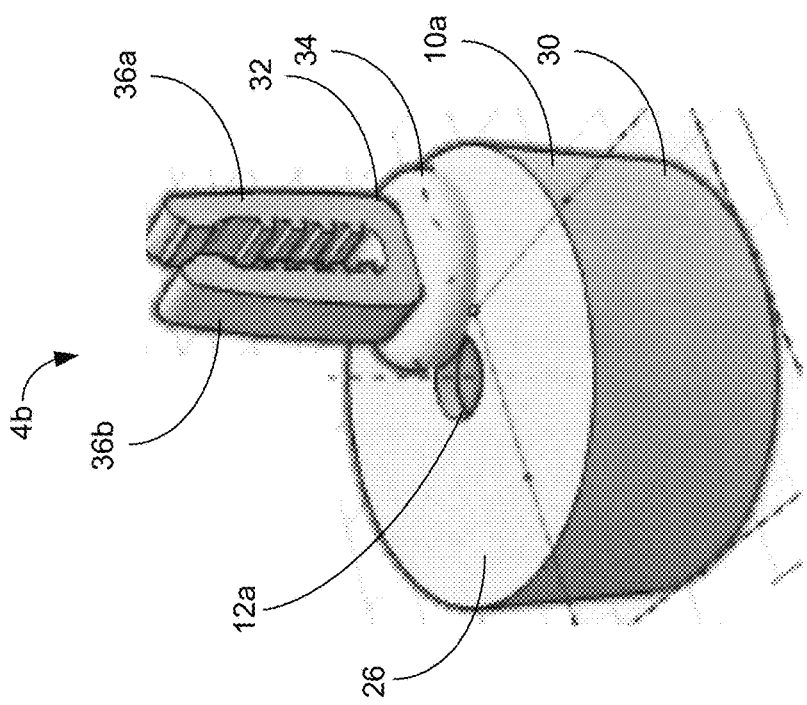
Figure 3C:
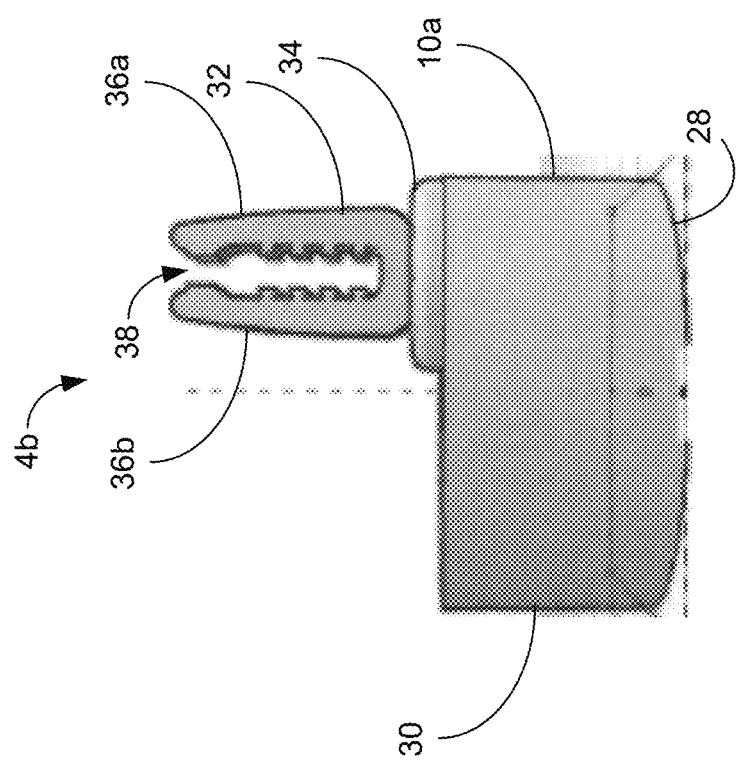

FIGS. 3A-3C illustrate a vent sensor 4b, in accordance with some embodiments. The vent sensor 4b is similar to the vent sensor 4 discussed above, and similar description is not repeated herein. The vent sensor 4b includes a cylindrical body 10a. The cylindrical body 10a includes an intake face 26, a rear face 28, and a sidewall 30 extending therebetween. In the illustrated embodiment, the intake face 26 and the rear face 28 have similar diameters, although it will be appreciated that the intake face 26 can have a greater and/or lesser diameter than the rear face 28.

The intake face 26 defines an intake 12a. The intake 12a includes a circular opening extending through the intake face 26 to an internal volume 46 of the vent sensor 4b. The intake 12a can be positioned in any suitable location on the intake face 26. For example, in the illustrated embodiment, the intake 12a is centered on the intake face 26, although it will be appreciated that the intake 12a can be offset from the center of the intake face 26 and is within the scope of this disclosure. In the illustrated embodiment, the intake 12a functions as an intake/exhaust and allows air flow into and out of the body 10a of the vent sensor 4b. In other embodiments, an exhaust face 28 can define an exhaust.

In some embodiments, an attachment mechanism 32 is coupled to the intake face 26. The attachment mechanism 32 is sized and configured to couple the vent sensor 4b to an output air vent of an air conditioning system. In the illustrated embodiment, the attachment mechanism 32 is a clip. The clip includes a base 34 and a pair of prongs 36a, 36b extending from the base 34. The prongs 36a, 36b define a channel 38 therebetween sized and configured to receive a portion of an output air vent of an air conditioning system therein such that the vent sensor 4b is retained on the output air vent. Although a clip is illustrated, it will be appreciated that any suitable attachment mechanism 32 can be used to couple the body 10a to the output air vent. For example, the attachment mechanism 32 can include any suitable adhesive, mechanical coupling (clip, press-fit, etc.), and/or any other suitable attachment mechanism 32.

Figure 4A:
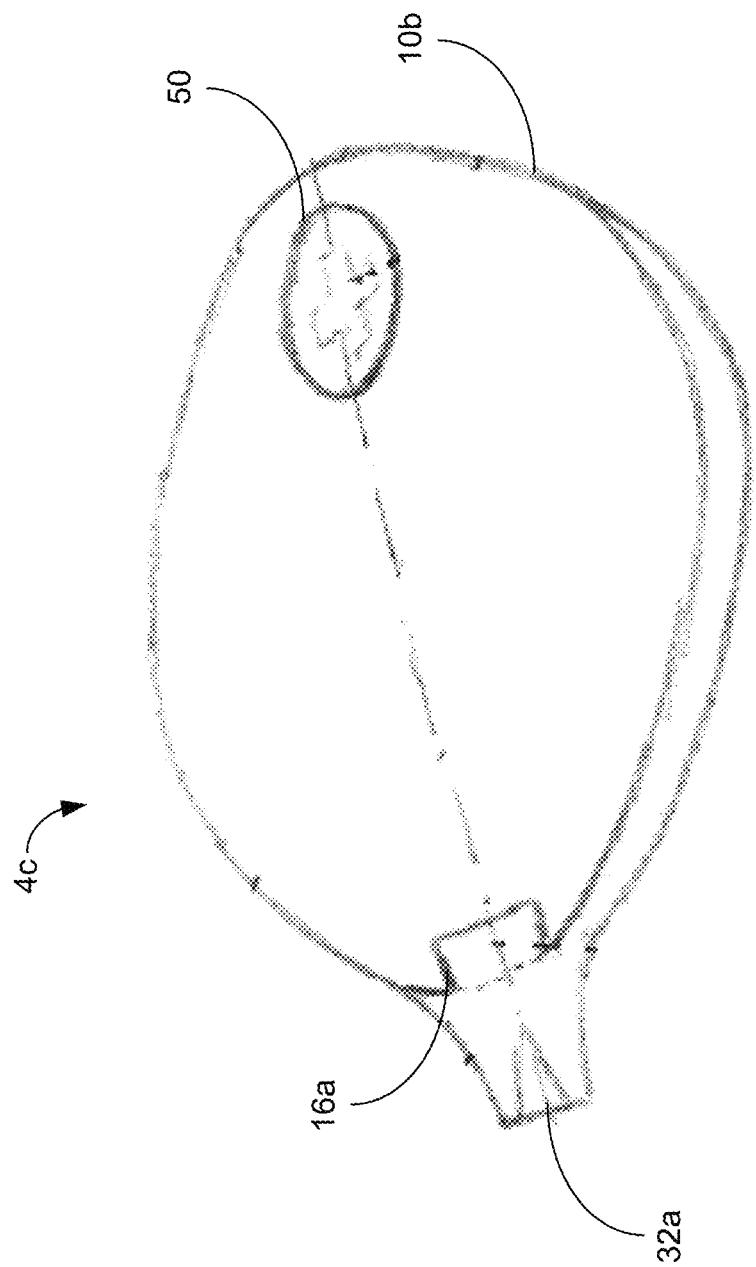
FIGS. 4A-4B illustrate a vent sensor configured to couple to an output vent of an air conditioning system, in accordance with some embodiments.
Figure 4B:
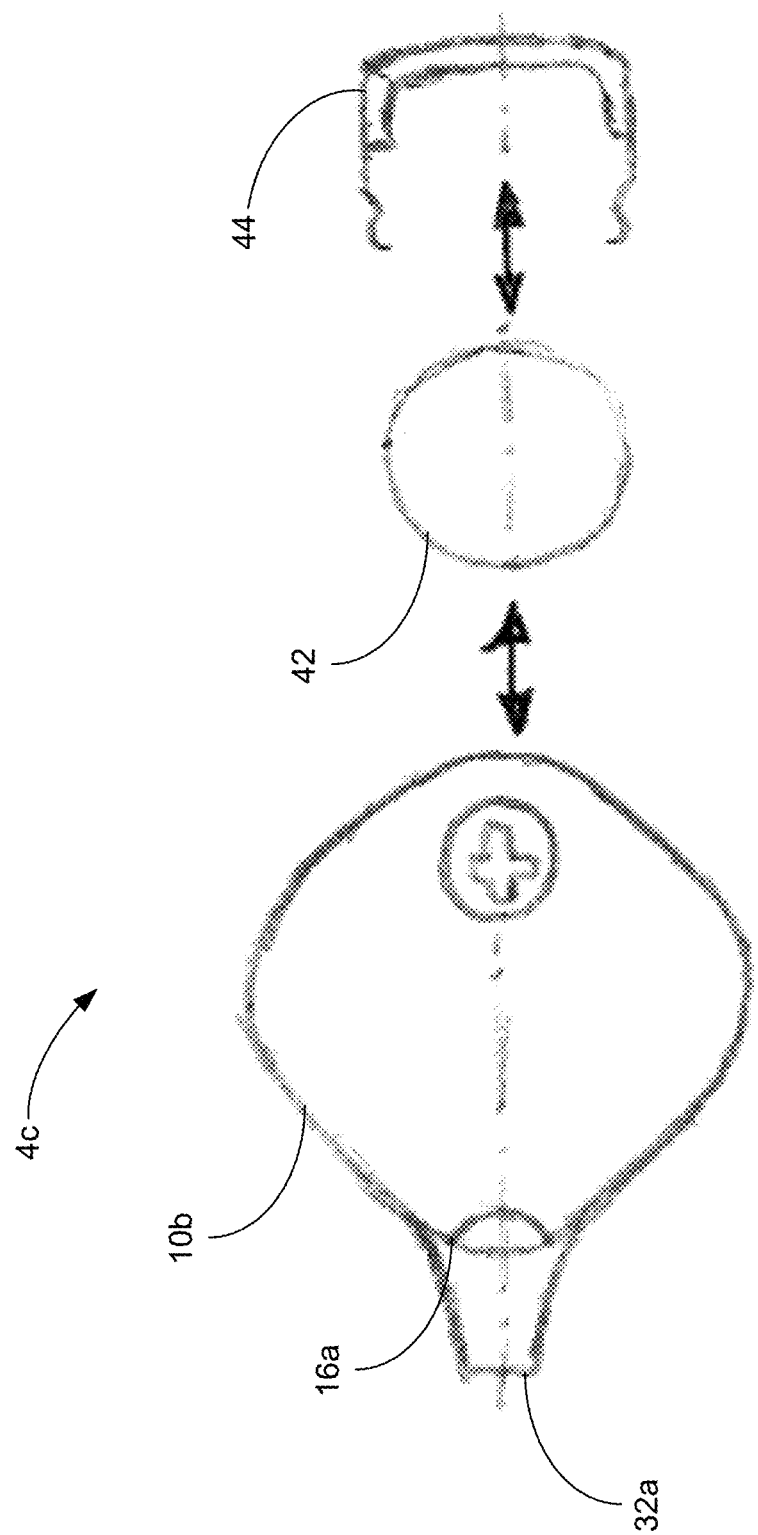

FIGS. 4A-4B illustrate an embodiment of a vent sensor 4c, in accordance with some embodiments. The vent sensor 4c includes a body 10b defining a generally clam-shell shape. A sensor unit 16a is coupled to an outer surface of the body 10b. The sensor unit 16a is positioned in-line with an attachment mechanism 32a such that when the vent sensor 4c is coupled to an output vent of an air conditioning system, the sensor unit 16a is positioned in-line with the air flow from the output vent. In some embodiments, the vent sensor 4c is configured to receive a battery 42 within a recess defined by the body 10b. A battery retention clip 44 is configured to be inserted into the recess to maintain the battery in a fixed position.

Figure 5A:
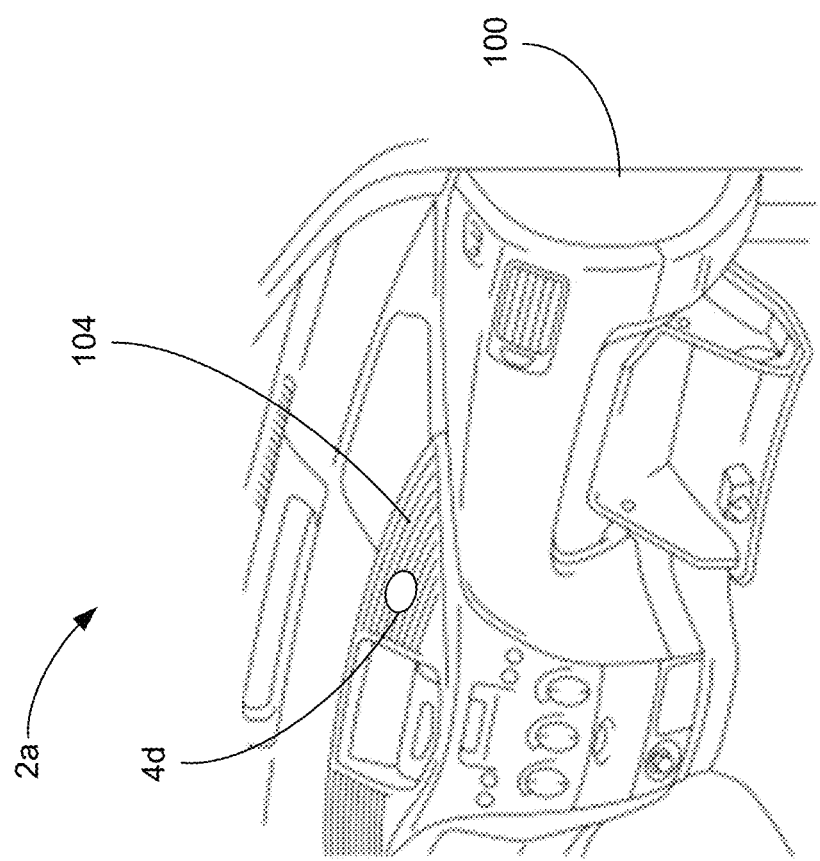
FIGS. 5A-5B illustrate a system for monitoring and performing a recharge operation of an air conditioning system in a motor vehicle, in accordance with some embodiments.
Figure 5B:
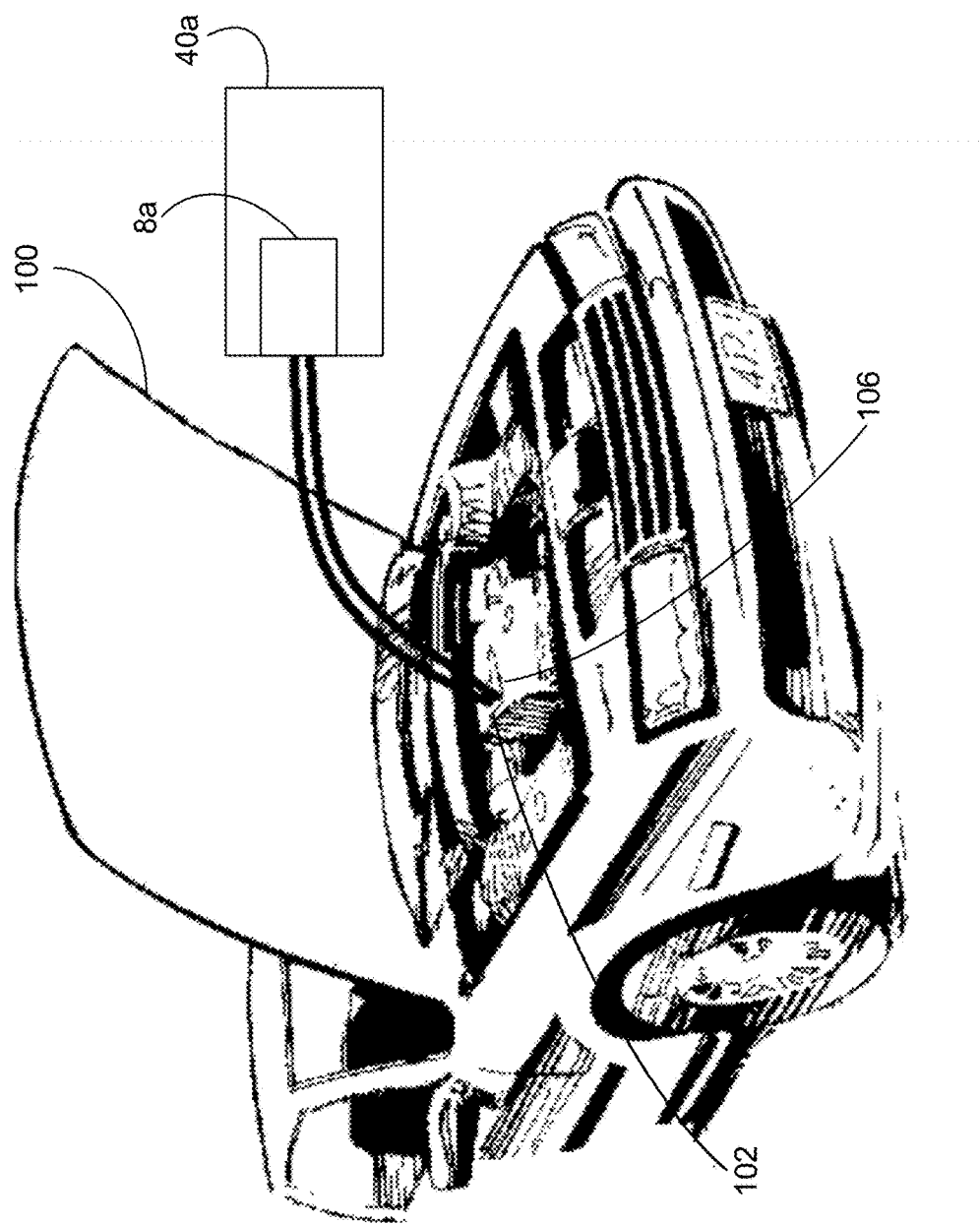

FIGS. 5A-5B illustrate an embodiment of a system 2a configured to recharge an air conditioning system 102 of a motor vehicle 100. The system 2a includes a vent sensor 4d coupled to an output vent 104 of the air conditioning system 102. The vent sensor 4d can include any suitable vent sensor and/or features of a vent sensor discussed herein. The vent sensor 4d is configured to receive an air flow output from the output vent 104 through an intake 12 (see FIGS. 3A-3E). A sensor unit 16 in the vent sensor 4d is configured to measure one or more parameters of the air flow output and transmit the one or more parameters to a computing device, such as computing device 6.

The system 2a includes a charging reservoir 40a. The charging reservoir 40a is configured to recharge a refrigerant reservoir 106 of the air conditioning system 102. In some embodiments, the charging reservoir 40a recharges the refrigerant reservoir 106 based on the one or more measured parameters of the air flow output. For example, in some embodiments, the vent sensor 4d is configured to provide at least one measured parameter of the air flow output to a computing device 6. The computing device 6 calculates the current charge state of the refrigerant reservoir 106 based on the at least one measured parameter and indicates whether additional charging from the charging reservoir 40*a* is required.

In some embodiments, a flow controller 8*a* is coupled to the charging reservoir 40*a* to control refrigerant flow from the charging reservoir 40*a* to the air conditioning system 102. The flow controller 8*a* can be configured to receive a signal from the computing device 6 for controlling a flow rate from the charging reservoir 40*a* to the air conditioning system 102. For example, in some embodiments, the computing device 6 is configured to determine the current charge state of the refrigerant reservoir 106 and determine whether refrigerant should be added and/or removed from the refrigerant reservoir 106. If refrigerant is to be added, the computing device 6 transmits a signal to the flow controller 8*a* to transfer refrigerant from the charging reservoir 40*a* to the refrigerant reservoir 106. If refrigerant is to be removed, the computing device 6 transmits a signal to the flow controller 8*a* to transfer refrigerant from the refrigerant reservoir 106 to the charging reservoir 40*a* and/or to the separate discharge reservoir (now shown). In other embodiments, the flow controller 8*a* can be controlled by one or more alternative methods.

Figure 6:
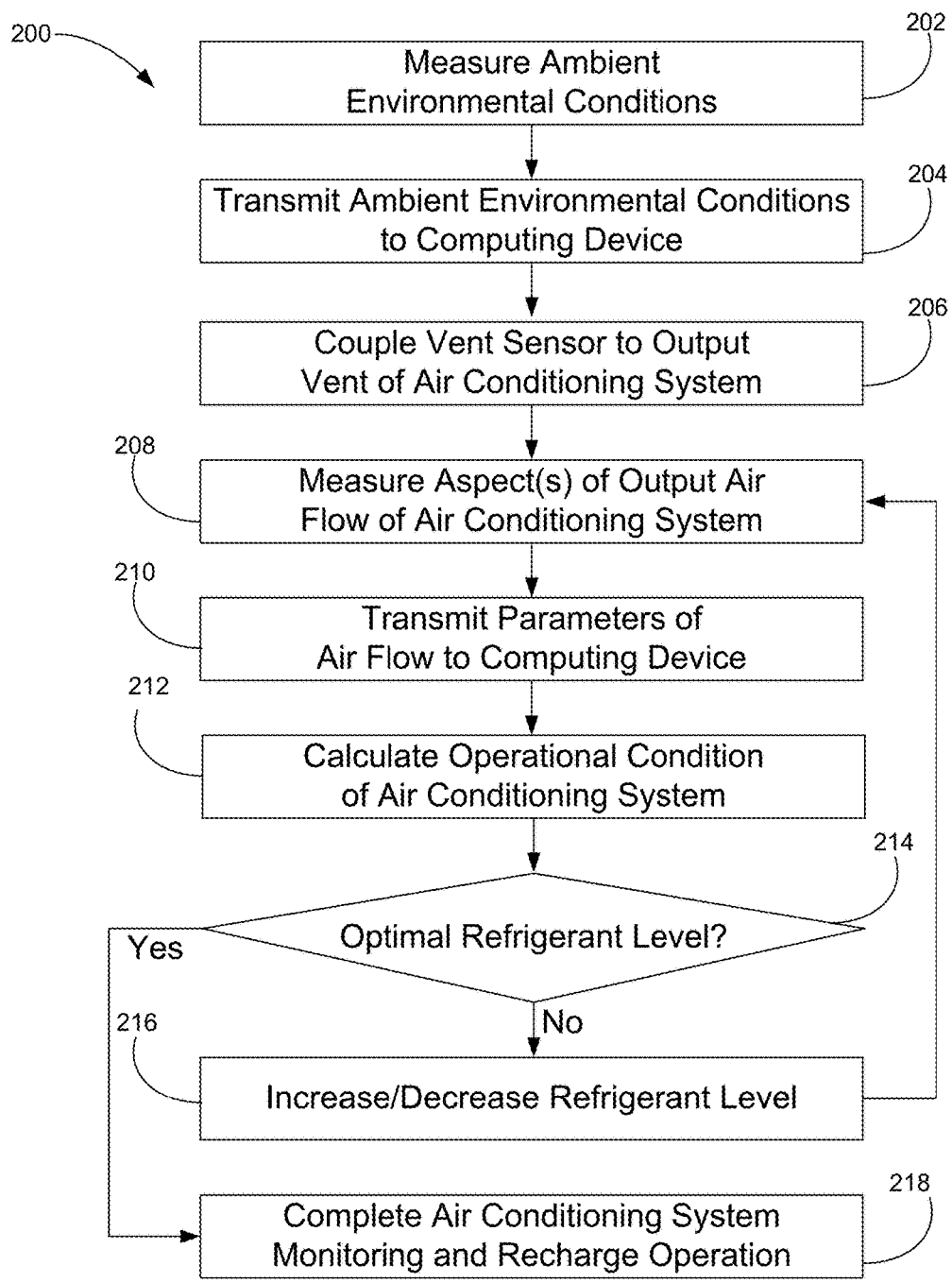
FIG. 6 illustrates a method of recharging an air conditioning system using the system of FIG. 1, in accordance with some embodiments.

FIG. 6 illustrates a method 200 of recharging an air conditioning system, such as the air conditioning system 102 illustrated in FIGS. 5A-5B and/or the room (or home) air conditioning 652 illustrated in FIG. 11 and described in detail below, using a monitoring and recharge system, such as the systems 2-2*a* discussed above, in accordance with some embodiments. At step 202, one or more ambient environmental conditions, such as ambient temperature and/or ambient humidity are measured. The ambient environmental conditions can be measured using a sensor integrally formed in the vent sensor 4 and/or using any other sensor module. For example, in some embodiments, the ambient environmental conditions can be measured using the sensor unit 16, a separate ambient condition sensor module formed integrally and/or coupled to the vent sensor 4, and/or a separate sensor module.

At step 204, the ambient environmental conditions are provided to the computing device 6. The ambient environmental conditions can be provided using any suitable communications system, such as, for example a wireless communication module 20*a* and/or wired communication module 20*b*. The ambient environmental conditions can be transmitted using any suitable protocol over any suitable medium, as discussed herein.

At step 206, the vent sensor 4 is coupled to an output air vent 104 of the air conditioning system to be monitored and/or recharged, such as air conditioning system 102, 652. The vent sensor 4 can be coupled to the output air vent 104 using any suitable attachment mechanism, such as, for example, a mechanical attachment (such as a clip, pin, etc.), an adhesive attachment, and/or any other suitable attachment. The vent sensor 4 is coupled to the output air vent 104 such that air flow from the output vent 104 is directed towards and/or into an inlet 12 formed in the vent sensor 4.

At step 208, the vent sensor 4 measures one or more parameters of an air flow output of the air conditioning system 102, 652. The vent sensor 4 can measure the temperature, humidity, and/or additional or alternative parameters of the air flow output. The one or more parameters of the air flow output are measured by a sensor unit 16 formed integrally with the vent sensor 4. The sensor unit 16 includes one or more sensors configured to measure the one or more parameters of the air flow output.

At step 210, the one or more measured parameters of the air flow output are provided to the computing device 6. The measured parameters can be provided using any suitable communications system, such as, for example a wireless communication module 20*a* and/or wired communication module 20*b*. The measured parameters can be transmitted using any suitable protocol over any suitable medium, as discussed herein.

At step 212, the computing device 6 determines the current operational state of the air conditioning system 102, 652, such as the level of refrigerant in the air conditioning system 102, 652 and determines, at step 214, whether refrigerant should be added and/or removed from the air conditioning system 102, 652. The computing device 6 can utilize one or more algorithms, parameters and/or other functions to determine the level of refrigerant in the air conditioning system. For example, in some embodiments, a correlation between the ambient humidity, the ambient temperature, the output temperature of the air conditioning system 102, 652 can be used to determine the current level of refrigerant in the air conditioning system 102, 652, although it will be appreciated that additional and/or alternative ambient and/or measured parameters can be used to determine the current level of refrigerant in the air conditioning system 102, 652.

For example, in some embodiments, an ambient temperature in a range of about 80-85° F. can be measured by the vent sensor 4 at step 202. At step 210, a temperature of the air flow output of the air conditioning system is measured and compared to one or more additional ambient environmental parameters to determine if the air flow temperature falls outside of a predetermined optimal range, such as, for example, 35-45° F. If the measured air flow output temperature is above 45° F., the computing device 6 determines that the current level of refrigerant in the air conditioning system 102, 652 is below (or above) optimal levels. Similarly, if the measured air flow output temperature is above 35° F. but below 45° F., the computing device 6 determines that the current level of refrigerant in the air conditioning system 102, 652 is at optimal levels. As another example, in some embodiments, an ambient humidity of about 90% can be measured by the vent sensor 4 at step 202. At step 210, a humidity of the air flow output of the air conditioning system 102, 652 is measured and compared to one or more additional ambient environmental parameters to determine if the air flow humidity falls outside of a predetermined optimal humidity range, such as 15-25%. If the measured air flow humidity is above 25%, the computing device 6 determines that the current level of refrigerant in the air conditioning system 102, 652 is below (or above) optimal levels. Similarly, if the measured air flow humidity is above 15% but below 25%, the computing device 6 determines that the current level of refrigerant in the air conditioning system 102, 652 is at optimal levels. The ranges and/or ambient conditions discussed herein are provided only as examples, and it will be appreciated that the computing device 6 can determine an optimal range based on any applicable ambient environmental conditions and/or air flow parameters.

If the computing device 6 determines that the refrigerant level is not at optimal levels and that refrigerant should be added or removed from the air conditioning system 102, 652, the method 200 proceeds to step 216. If the computing device 6 determines the refrigerant level is at optimal levels, the method 200 proceeds to step 218. At step 216, refrigerant is added to and/or removed from the air conditioning system 102, 652. A flow controller 8 can be operated to add and/or remove the refrigerant. In some embodiments, the flow controller 8 is controlled by the computing device 6. For example, in some embodiments, the computing device 6 generates a signal based on the calculated current level of refrigerant in the air conditioning system 102, 652. If the current level of refrigerant is determined to be low, the flow controller 8 is operated to add refrigerant to the air conditioning system 102, 652. Similarly, if the current level of refrigerant is high, the flow controller 8 (and/or an alternative release valve) can be operated to remove refrigerant from the air conditioning system 102, 652.

Continuing one of the examples from above, if the measured air flow output temperature is above 45° F. (e.g., above the predetermined optimal temperature range), the computing device 6 activates the flow controller 8 to add and/or remove refrigerant to the refrigerant reservoir 106 of the air conditioning system 102, 652. It will be appreciated by those skilled in the art that different behaviors for different optimal ranges and/or non-optimal measurements are within the scope of this disclosure.

The method 200 repeats steps 208-216 as necessary to obtain an optimal charge level of refrigerant within the air conditioning system 102, 652. The method 200 can repeat the steps of measuring one or more parameters of the output flow, calculating the refrigerant level, and adjusting the refrigerant level as needed. When the computing device 6 determines that an optimal refrigerant level has been reached, the method 200 proceeds to step 218. At step 218, the recharge operation is completed. In some embodiments, the computing device 6 can generate an output indicative of the completed recharge operation and can indicate, for example, the amount of refrigerant added, the remaining refrigerant in a reservoir, the rate of loss of refrigerant over time, and/or any other suitable data. The data received and/or calculated by the computing device 6 can be provided to a remote server for storage, comparison, collation, and/or any other suitable use.

Figure 7:
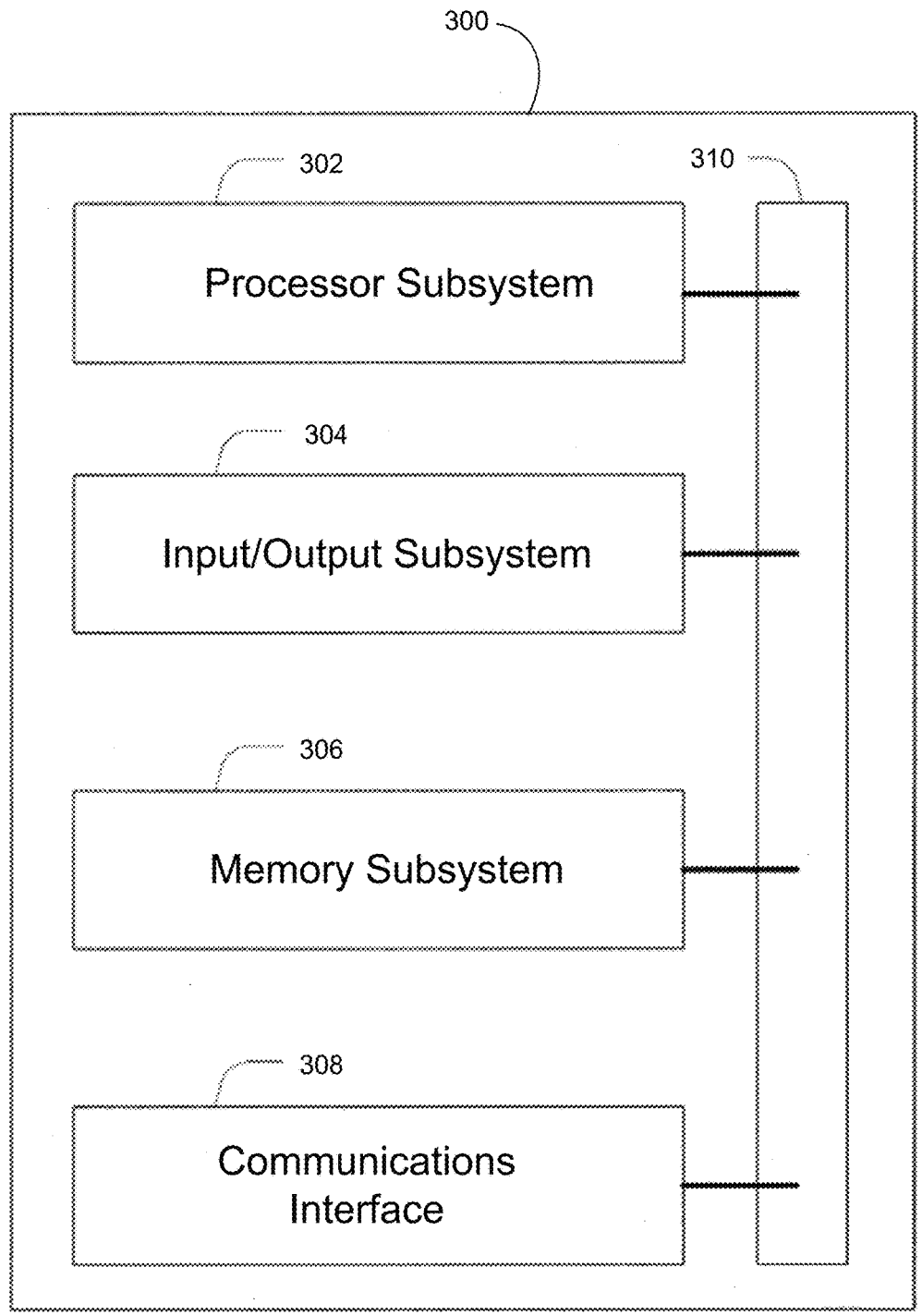
FIG. 7 illustrates a schematic diagram of a computing device, in accordance with some embodiments.

FIG. 7 is a schematic view of an illustrative electronic device 300 capable of implementing the system and method of customization third-party devices using a smart device. The electronic device 300 is a representative device that be a representative embodiment of the computing device 6. The electronic device 300 may comprise a processor subsystem 302, an input/output subsystem 304, a memory subsystem 306, a communications interface 308, and a system bus 310. In some embodiments, one or more than one of the electronic device 300 components may be combined or omitted such as, for example, not including the communications interface 308. In some embodiments, the electronic device 300 may comprise other components not combined or comprised in those shown in FIG. 7. For example, the electronic device 300 also may comprise a power subsystem. In other embodiments, the electronic device 300 may comprise several instances of the components shown in FIG. 7. For example, the electronic device 300 may comprise multiple memory subsystems 306. For the sake of conciseness and clarity, and not limitation, one of each of the components is shown in FIG. 7.

The processor subsystem 302 may comprise any processing circuitry operative to control the operations and performance of the electronic device 300. In various parameters, the processor subsystem 302 may be implemented as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 302 also may be implemented by a controller, a microcontroller, an application specific integrated circuit (ASIC), a field programmable gate array (FPGA), a programmable logic device (PLD), and so forth.

In various parameters, the processor subsystem 302 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, the electronic device 300 may comprise a system bus 310 that couples various system components including the processing subsystem 302, the input/output subsystem 304, and the memory subsystem 306. The system bus 310 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 304 may comprise any suitable mechanism or component to at least enable a user to provide input to the electronic device 300 and the electronic device 300 to provide output to the user. For example, the input/output subsystem 304 may comprise any suitable input mechanism, including but not limited to, a button, keypad, keyboard, click wheel, touch screen, or motion sensor. In some embodiments, the input/output subsystem 304 may comprise a capacitive sensing mechanism, or a multi-touch capacitive sensing mechanism.

In some embodiments, the input/output subsystem 304 may comprise specialized output circuitry associated with output devices such as, for example, an audio peripheral output device. The audio peripheral output device may comprise an audio output including on or more speakers integrated into the electronic device. The speakers may be, for example, mono or stereo speakers. The audio peripheral output device also may comprise an audio component remotely coupled to audio peripheral output device such as, for example, a headset, headphones, and/or ear buds which may be coupled to the audio peripheral output device through the communications subsystem 308.

In some embodiments, the input/output subsystem 304 may comprise a visual peripheral output device for providing a display visible to the user. For example, the visual peripheral output device may comprise a screen such as, for example, a Liquid Crystal Display (LCD) screen, incorporated into the electronic device 300. As another example, the visual peripheral output device may comprise a movable display or projecting system for providing a display of content on a surface remote from the electronic device 300.

In some embodiments, the visual peripheral output device can comprise a coder/decoder, also known as a Codec, to convert digital media data into analog signals. For example, the visual peripheral output device 402 may comprise video Codecs, audio Codecs, or any other suitable type of Codec.

The visual peripheral output device also may comprise display drivers, circuitry for driving display drivers, or both. The visual peripheral output device may be operative to display content under the direction of the processor subsystem 302. For example, the visual peripheral output device may be able to play media playback information, application screens for application implemented on the electronic device 300, information regarding ongoing communications operations, information regarding incoming communications requests, or device operation screens, to name only a few.

In some embodiments, the input/output subsystem 304 may comprise a virtual input/output system. The virtual input/output system is capable of providing input/output options by combining one or more input/output components to create a virtual input type. For example, the virtual input/output system may enable a user to input information through an on-screen keyboard which utilizes the touch screen and mimics the operation of a physical keyboard or using a motion sensor to control a pointer on the screen instead of utilizing the touch screen. As another example, the virtual input/output system may enable alternative methods of input and output to enable use of the device by persons having various disabilities. For example, the virtual input/output system may convert on-screen text to spoken words to enable reading-impaired persons to operate the device.

In some embodiments, the communications interface 308 may comprises any suitable hardware, software, or combination of hardware and software that is capable of coupling the electronic device 300 to one or more networks and/or additional devices (such as, for example, the vent sensor 4 and/or the flow controller 8). The communications interface 308 may be arranged to operate with any suitable technique for controlling information signals using a desired set of communications protocols, services or operating procedures. The communications interface 308 may comprise the appropriate physical connectors to connect with a corresponding communications medium, whether wired or wireless.

Vehicles of communication comprise a network. In various parameters, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, smart devices such as those discussed herein, and/or any other suitable smart device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various parameters, the communications interface 308 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 308 may comprise a wireless interface comprising one or more antennas, transmitters, receivers, transceivers, amplifiers, filters, control logic, and so forth.

In various parameters, the communications interface 308 may provide voice and/or data communications functionality in accordance with different types of cellular radiotelephone systems. In various implementations, the described parameters may communicate over wireless shared media in accordance with a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.1 with Enhanced Data Rate (EDR), v3.0 with Enhanced Data Rate (EDR), v4.0 low energy (LE), v4.1, v4.2. v5.0, as well as one or more Bluetooth Profiles, and so forth. Yet another example of wireless protocols may comprise near-field communication techniques and protocols, such as electromagnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In various implementations, the described parameters may comprise part of a cellular communication system.

Examples of cellular communication systems may comprise CDMA cellular radiotelephone communication systems, GSM cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) wireless standards systems such as WCDMA, CDMA-2000, UMTS cellular radiotelephone systems compliant with the Third-Generation Partnership Project (3GPP), fourth generation (4G) wireless standards, and so forth.

In some embodiments, the memory subsystem 306 may comprise any machine-readable or computer-readable media capable of storing data, including both volatile/non-volatile memory and removable/non-removable memory. The memory subsystem 306 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the electronic device 300.

In various parameters, the memory subsystem 306 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In some embodiments, the memory subsystem 306 may contain a software program for transmitting and/or receiving customization information and/or data mining elements. In one embodiment, the memory subsystem 306 may contain an instruction set, in the form of a file for executing a method of customization on the electronic smart device 100. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 302.

Figure 8:
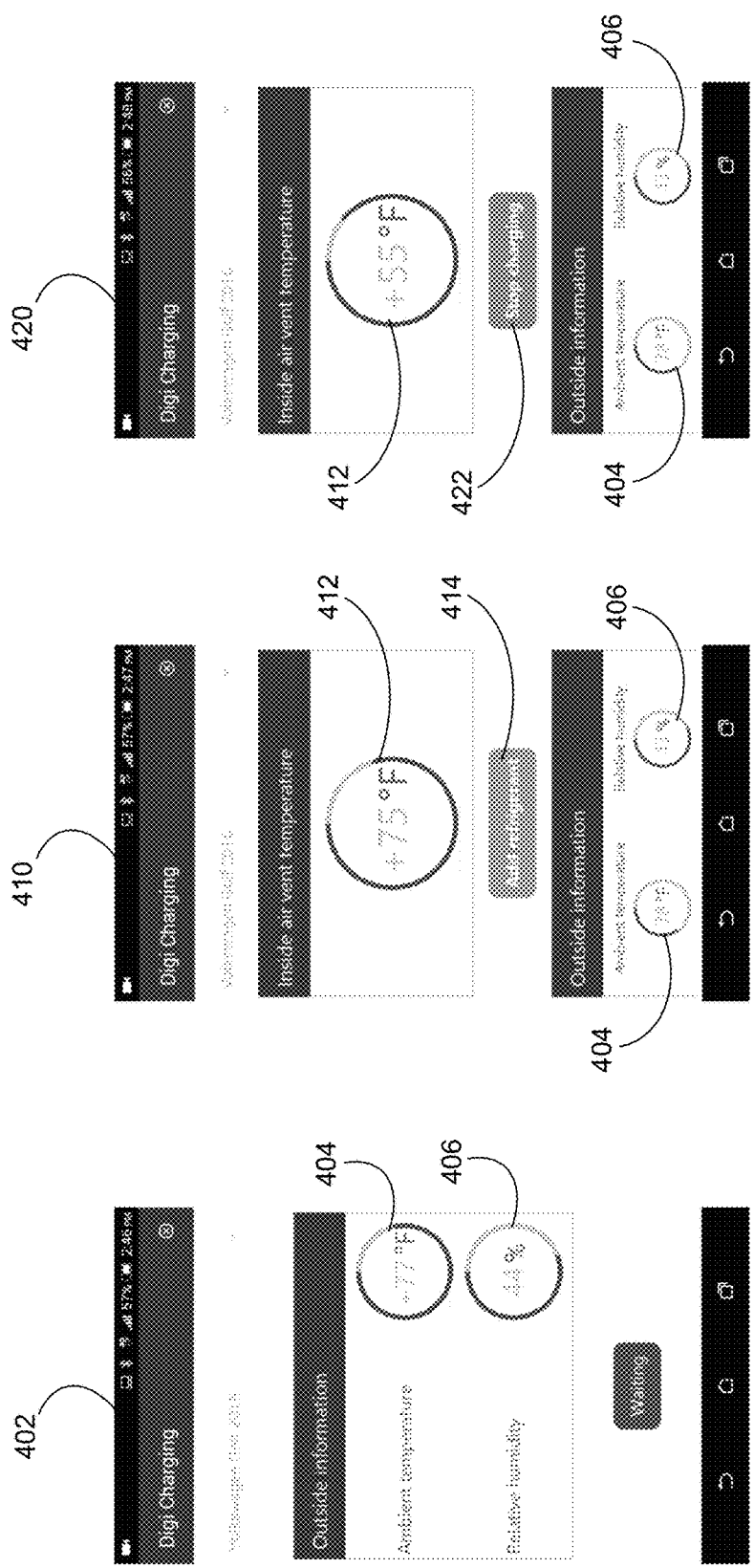
FIGS. 8A-8C illustrate a plurality of user interface screens configured to control operation of a vent sensor and/or recharging system, in accordance with some embodiments.

FIGS. 8A-8C illustrate a plurality of exemplary user interface screens that can be generated and/or present by the computing device 6, 300 to facilitate a recharge operation of an air conditioning system. Although exemplary user interface screens are included herein, it will be appreciated that alternative and/or additional user interface screens can be generated by the computing device 6, 300. In addition, it will be appreciated that a recharge operation, such as according to the method 200 discussed above, can be conducted without the use of user interface screens in some embodiments.

FIG. 8A illustrates a user interface screen 402 illustrating an ambient environmental measuring step. The user interface screen 402 shows a measured ambient temperature 404 and a measured ambient relative humidity 406, although it will be appreciated that additional and/or alternative environmental parameters can be measured. FIG. 8B illustrates a user interface screen 410 illustrating a charging operation of an air conditioning system, such as air conditioning system 102, 652. A vent sensor, such as vent sensor 4, has provided a temperature 412 of an output air flow of the air conditioning system. Based on the output temperature, the computing device 6 has determined that additional refrigerant is to be added to the air conditioning system, as indicated at interface element 414. FIG. 8C illustrates a user interface screen 420 illustrating a completed charging operation of the air conditioning system. The vent sensor 4 indicates the output air temperature 412 of the air conditioning system 102, 652 has decreased, for example, from 75° F. to 55° F. The computing device 6 determines that the optimal refrigerant level has been achieved (for example, based on the ambient temperature, ambient humidity, and measured air flow output temperature of 55° F.), as indicated at interface element 422. Although example screens have been illustrated and discussed, it will be appreciated that alternative and/or additional user interface screens can be generated by the computing device 6.

Figure 9:
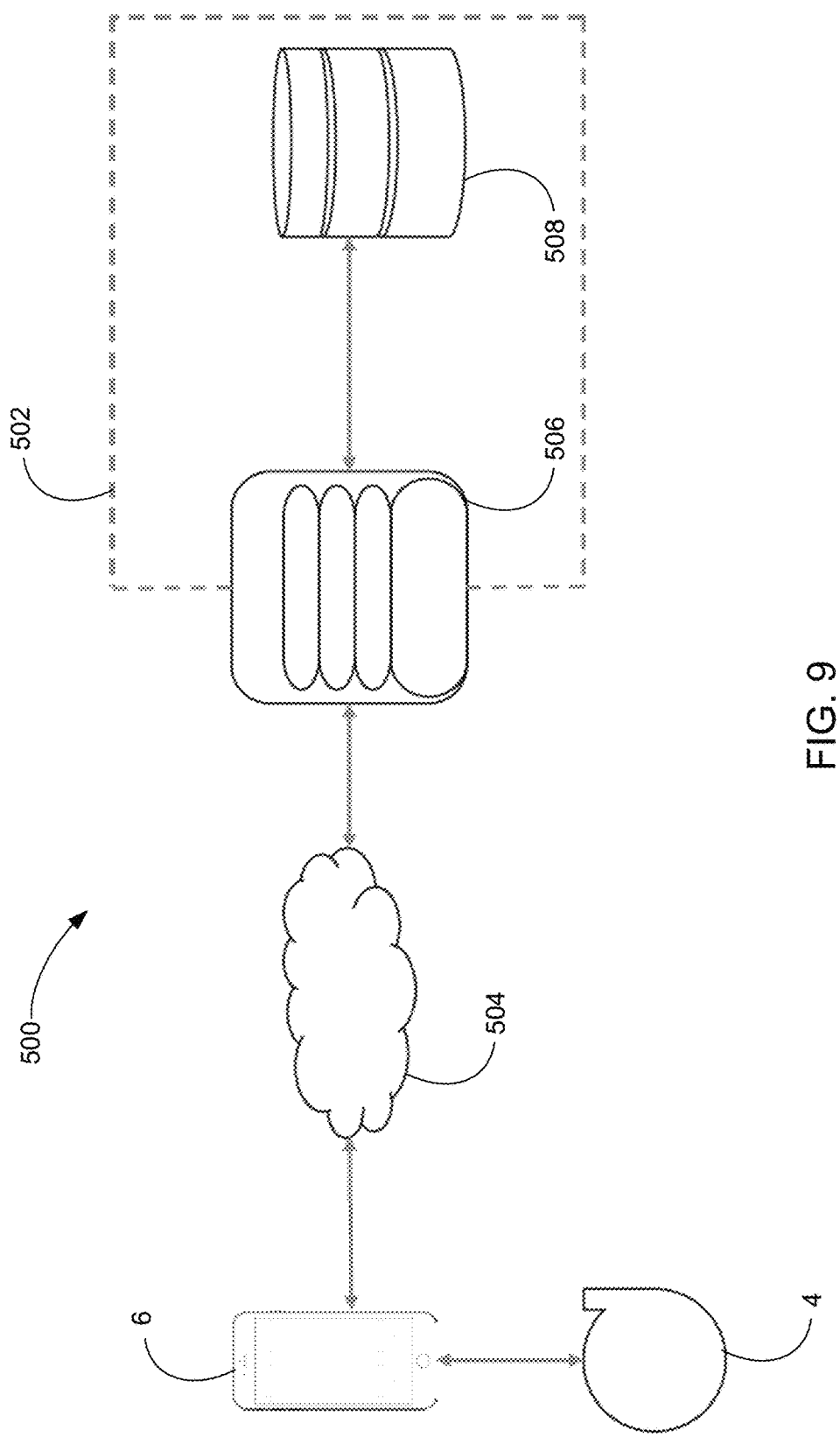
FIG. 9 illustrates a system for monitoring and recharging an air conditioning system including a remote server, in accordance with some embodiments.

FIG. 9 illustrates a system 500 for monitoring and recharging an air conditioning system, in accordance with some embodiments. The system 500 is similar to the system 2 discussed above and similar description is not repeated herein. The system 500 includes a remote server 502 configured to receive data from the computing device 6 and perform one or more operations. For example, in some embodiments, the remote server 502 is configured to receive data regarding a current and/or prior charge state of an air conditioning system, data regarding refrigerant added to an air conditioning system, and/or any other suitable data. The remote server 502 can be configured to store the data and/or perform additional operations with the data.

For example, in some embodiments, the remote server 502 is configured to compare a current charge state of an air conditioning system with one or more stored previous charge states of an air conditioning system. By comparing current and prior charge states, the remote server 502 can calculate and/or track refrigerant use and/or loss over a predetermined time period. Similarly, in some embodiments, the remote server 502 can be configured to track charging information for multiple air conditioning systems, such as multiple vehicles and/or structures.

Figure 10:
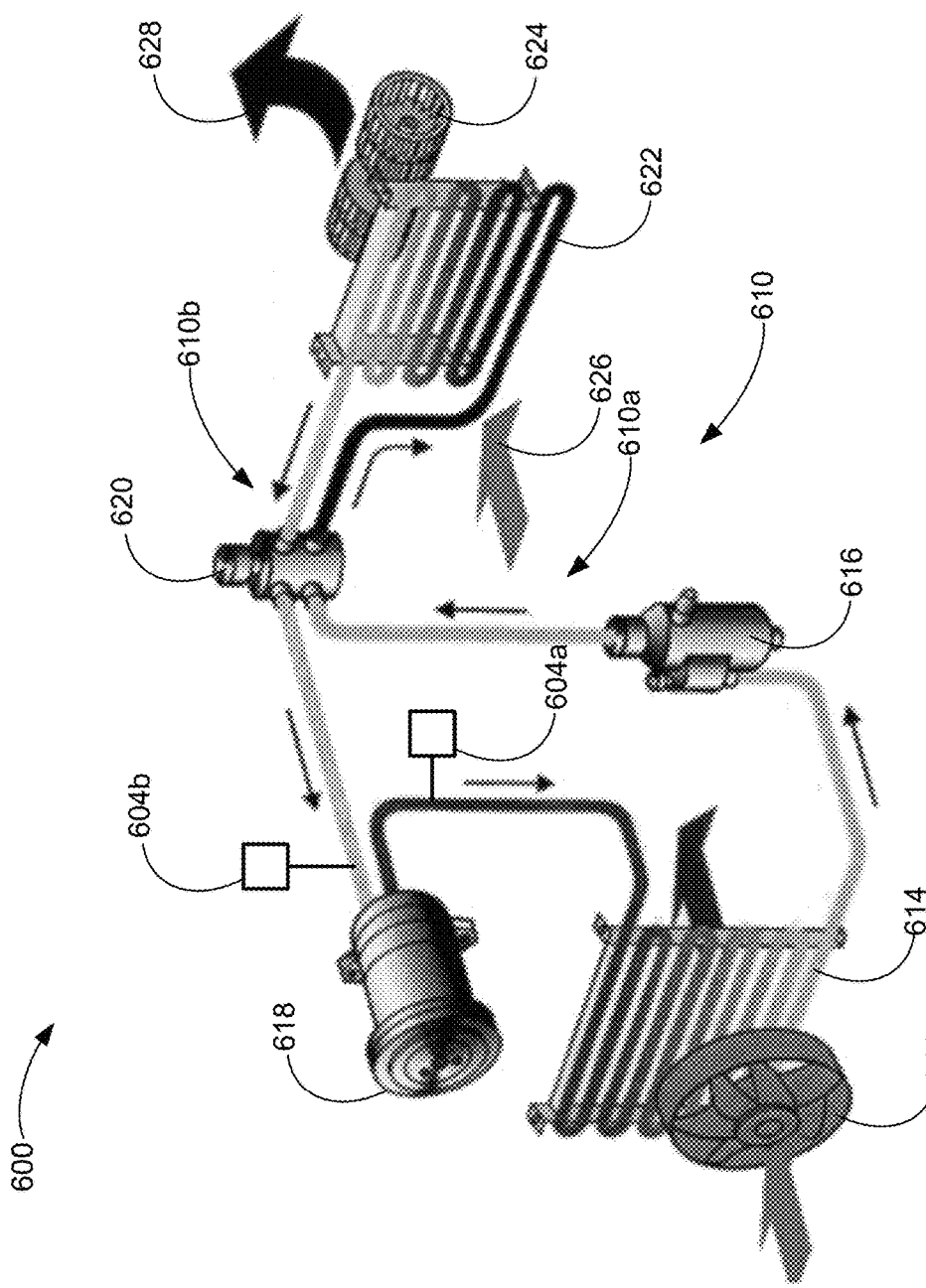
FIG. 10 illustrates a system for monitoring and performing a recharge operation of a vehicle air conditioning system having a high-pressure side and a low-pressure side, in accordance with some embodiments.

FIG. 10 illustrates a system 600 for monitoring and performing a recharge operation of a vehicle air conditioning system 610 having a high-pressure side 610a and a low-pressure side 610b, in accordance with some embodiments. The vehicle air conditioning system 610 is similar to the air conditioning system 102 discussed above, and similar description is not repeated herein. The vehicle air conditioning system 610 includes an intake fan 612 configured to draw air from an ambient environment. The intake fan 612 directs the air flow over a condenser 614. The condenser 614 receives a high-pressure flow of a refrigerant in a gas phase and cools the refrigerant to a liquid phase. The liquid phase refrigerant is passed from the condenser 614 to a drier 616, which further dries the refrigerant. An expansion valve 620 receives the refrigerant from the high-pressure side 610a of the system 610 and transitions the refrigerant to the low-pressure side 610*b*. The refrigerant flows from the expansion valve 620 to an evaporator 622. The evaporator 622 is configured to remove humidity from and cool the air flow 626 received from the environment, such as from an ambient environment of a vehicle and/or from a passenger compartment. The cooled air flow is provided to a blower 624 which directs the cooled/low-humidity air flow 628 into a passenger compartment of the vehicle (not shown). The refrigerant flow through the evaporator 622 is heated from a low-pressure liquid flow to a low-pressure gas flow. The expansion valve 620 receives the low-pressure gas flow and provides the gas flow to a compressor 618. The compressor 618 compresses the low-pressure gas flow of the low-pressure side 610*b* to a high-pressure gas flow of the high-pressure side 610*a*.

In some embodiments, the system 600 includes a first sensor 604*a* coupled to the high-pressure side 610*a* of the air conditioning system 610 and a second sensor 604*b* coupled to the low-pressure side 610*b* of the air conditioning system 610. Each of the first sensor 604*a* and the second sensor 604*b* are configured to monitor the pressure of respective high-pressure side 610*a* and low-pressure side 610*b* of the air conditioning system. The sensors 604*a*, 604*b* transmit a pressure reading to a remote system, such as computing device 6. The computing device 6 receives the pressure readings from each of the first sensor 604*a* and the second sensor 604*b* and determines the current status of the air conditioning system 610. For example, in some embodiments, the computing device 6 performs air conditioning system diagnostics to compare the high-pressure side 610*a* and the low-pressure side 610*b* pressure readings to determine whether the air conditioning system is under-charged, over-charged, and/or charged within a predetermined optimal range.

In some embodiments, a charging reservoir, such as charging reservoir 40 discussed above, can be coupled to one of the high-pressure side 610*a* and/or the low-pressure side 610*b*. The computing device 6 can be configured to control operation of the charging reservoir, for example through a flow controller 8 as discussed above, to increase and/or decrease the pressure of a respective high-pressure side 610*a* and/or a low-pressure side 610*b* of the air conditioning system 610.

Figure 11:
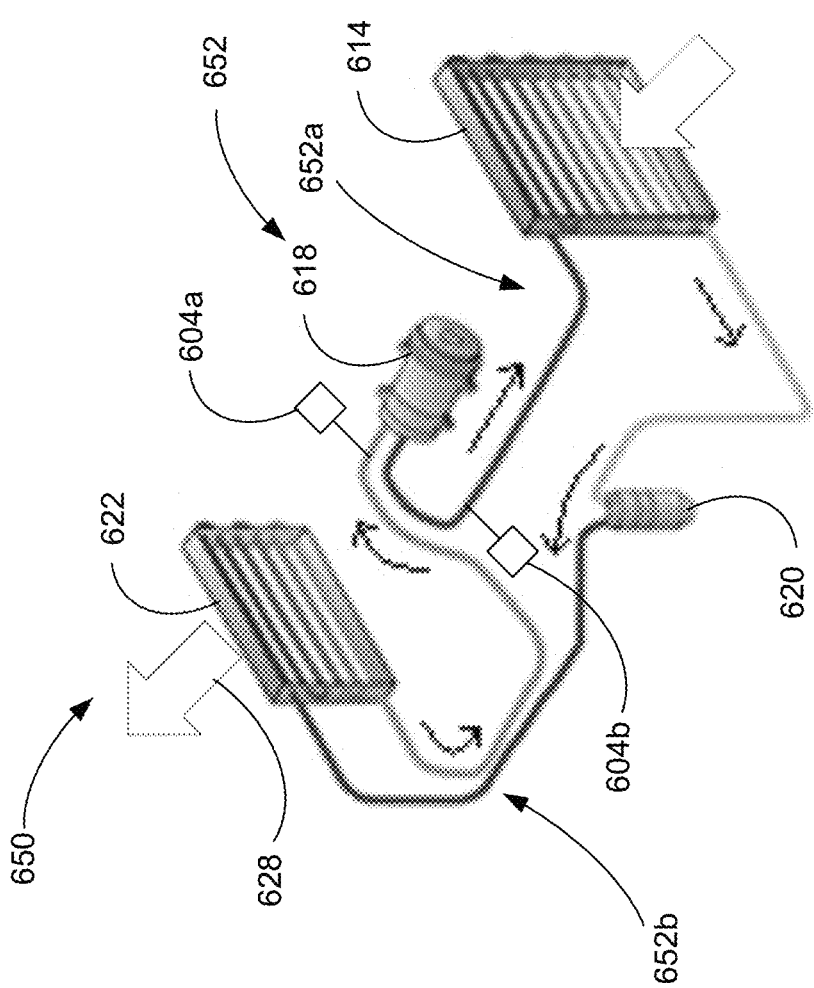
FIG. 11 illustrates a system for monitoring and performing a recharge operation of a room (or home) air conditioning system having a high-pressure side and a low-pressure side, in accordance with some embodiments.

FIG. 11 illustrates a system 650 for monitoring and performing a recharge operation of a room (or home) air conditioning system 652 having a high-pressure side 652*a* and a low-pressure side 652*b*, in accordance with some embodiments. The room (or home) air conditioning system 652 is similar to the vehicle air conditioning system 610 discussed in conjunction with FIG. 10, and similar description is not repeated herein. In some embodiments, a first sensor 604*a* is coupled to high-pressure side 652*a* and a second sensor 604*b* is coupled to the low-pressure side 652*b*. The first and second sensors 604*a*, 604*b* can be in communication with a remote computing device 6. The remote computing device 6 can include, but is not limited to, a home thermostat, a smart-home hub, a personal computing device, etc. The remote computing device 6 can be configured to perform air conditioning system diagnostics. The remote computing device 6 is configured to receive pressure readings from each of the first and second sensors 604*a*, 604*b* to determine whether the air conditioning system is under-charged, over-charged, and/or charged within a predetermined optimal range.

In some embodiments, the computing device 6 in signal communication with the first and second sensors 604*a*, 604*b* can be configured to control operation of the air conditioning system 652. For example, in some embodiments, the computing device 6 includes a home thermostat or smart-home hub configured to control operation of the air conditioning system 652. The computing device 6 can be configured to activate and/or deactivate the air conditioning system 652 based on one or more parameters. In some embodiments, the computing device 6 is configured to generate an alert and/or other notification when the refrigerant level in the air conditioning system 652 is below an optimal level. The computing device 6 can be configured to automatically recharge the air conditioning system 652 from a charging reservoir coupled to the air conditioning system 652.

Figure 12:
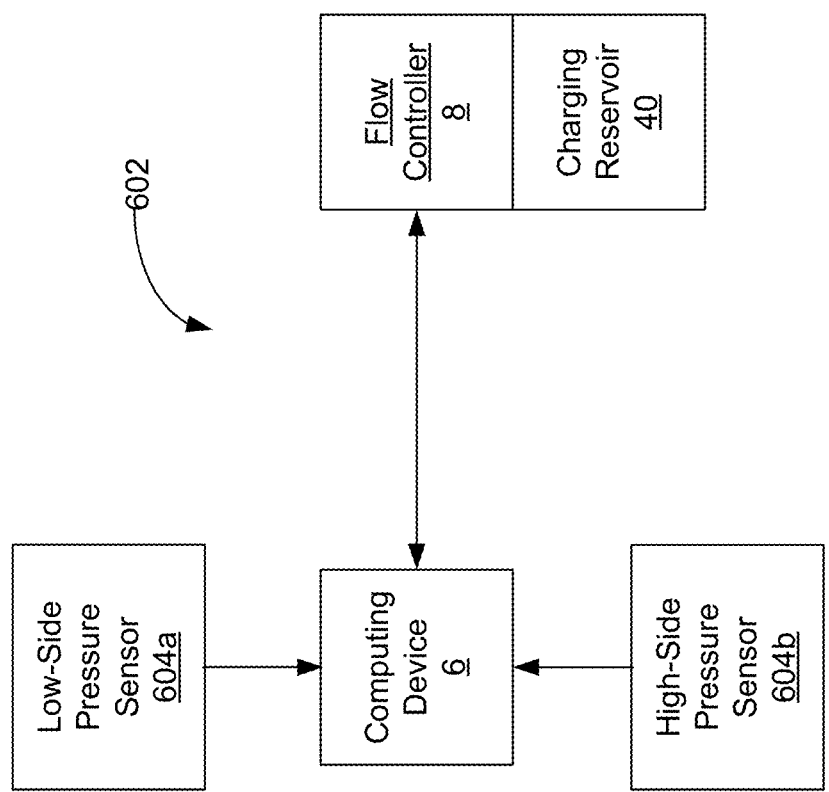
FIG. 12 illustrates a system for monitoring and performing a recharge operation of an air conditioning system including one or more pressure sensors, in accordance with some embodiments

FIG. 12 illustrates one embodiment of a system 602 for monitoring and recharging an air conditioning system, in accordance with some embodiments. The system 602 is similar to the system 2 discussed above, and similar description is not repeated herein. The system 602 includes a first pressure sensor 604*a*, a second pressure sensor 604*b*, and a computing device 6. The pressure sensors 604*a*, 604*b* are configured to couple to low-pressure side and/or a high-pressure side of an air conditioning system (see, for example, FIGS. 10-11). The pressure sensors 604*a*, 604*b* each include at least one intake configured to receive a portion of a fluid flow from a high-pressure and/or low-pressure side of the air conditioning system. The pressure sensors 604*a*, 604*b* each receive the fluid flow and measures a pressure of the respective fluid flow. In some embodiments, the pressure sensors 604*a*, 604*b* can be configured to measure additional parameters, such as, for example, temperature of the fluid flow, rate of the fluid flow, etc.

Figure 13:
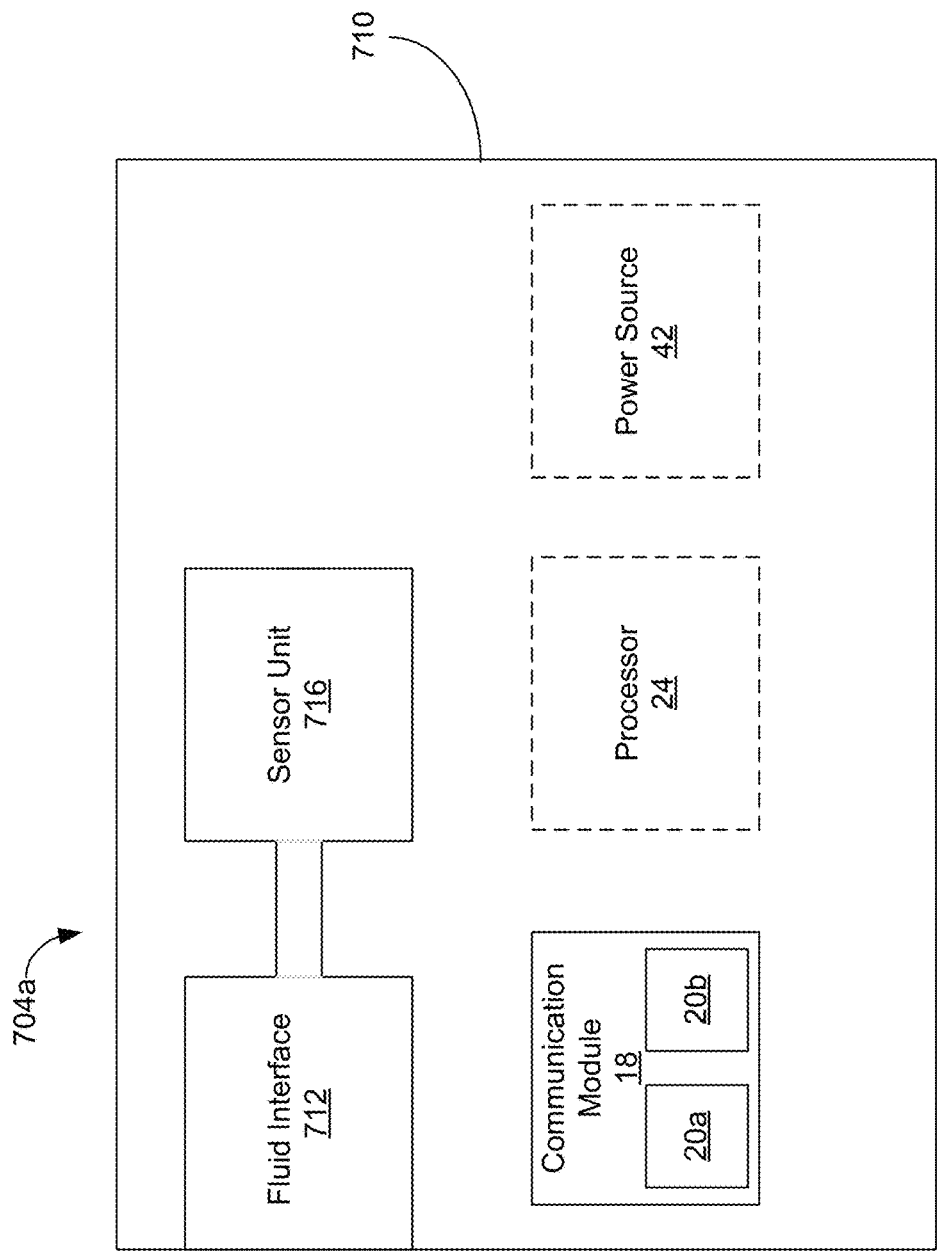
FIG. 13 illustrates a schematic diagram of a pressure sensor, in accordance with some embodiments.

FIG. 13 illustrates a pressure sensor 704*a*, in accordance with some embodiments. The pressure sensor 704*a* is configured for use with a system monitoring the high-pressure side and/or low-pressure side of an air conditioning system, such as, for example, systems 600, 650 discussed in conjunction with FIGS. 10 and 11. The pressure sensor 704*a* is similar to the sensor 604 discussed in conjunction with FIG. 12, and similar description is not repeated herein. In some embodiments, the pressure sensor 704*a* includes a fluid interface 712 configured to interact with and/or otherwise receive fluid from one of a high-pressure side or a low-pressure side of an air conditioning system. As used herein, the term fluid refers to a flow of material in one of a liquid or a gas phase.

The pressure of the fluid is measured by a sensor unit 716 coupled to the fluid interface 712. The sensor unit 716 can include any suitable sensor configured to measure a pressure of a fluid flow. The sensor unit 716 is configured to provide the pressure reading to one of a communication module 18 and/or a processor 24 for transmission to a remote computing device, such as computing device 6 discussed above. In some embodiments, the sensor unit 716 can include a power source 42 for powering one or more elements, such as a processor 24, a communications module 18, and/or the sensor unit 716.

Figure 14B:
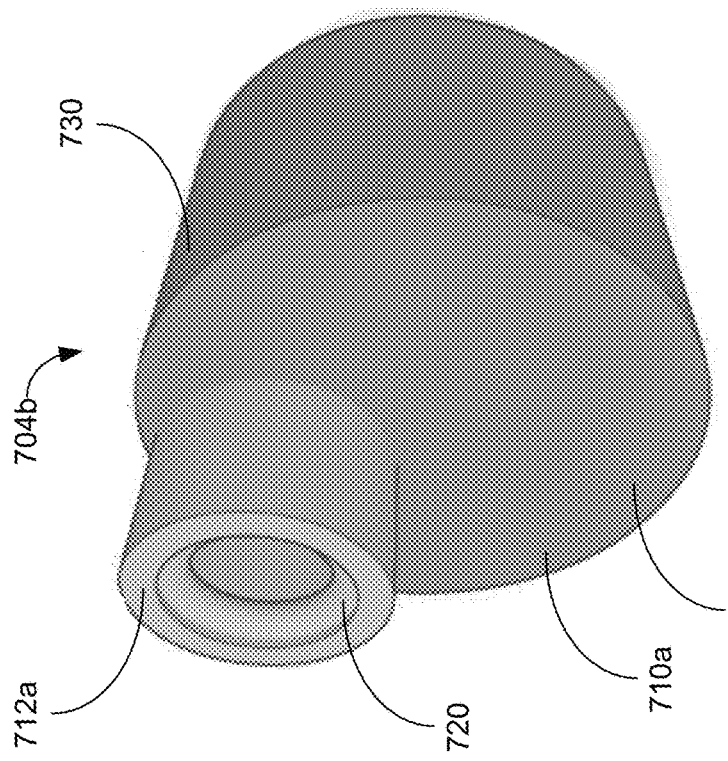
Figure 14A:
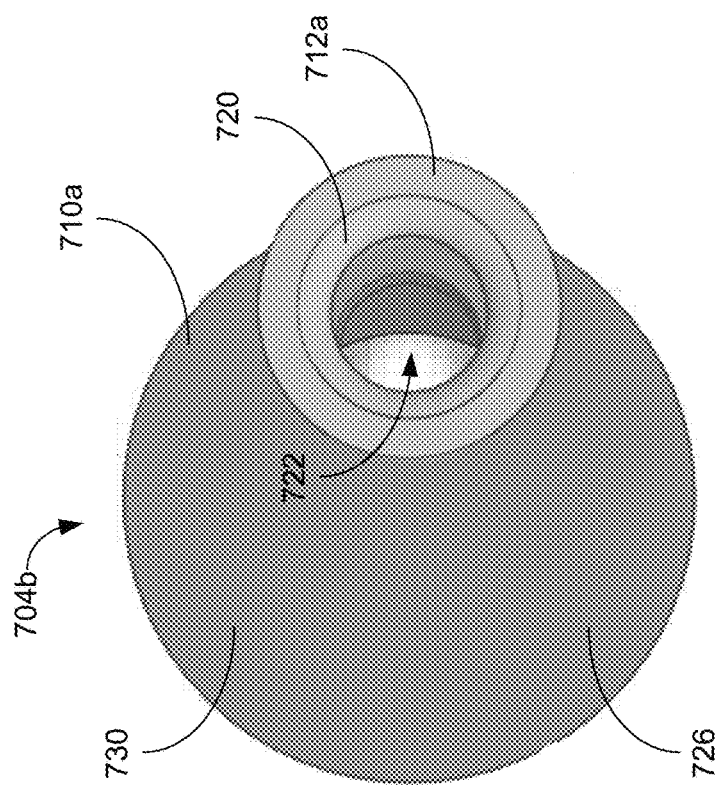

FIGS. 14A-14C illustrate a pressure sensor 704*b*, in accordance with some embodiments. The pressure sensor 704*b* is similar to the pressure sensor 704*a* discussed above, and similar description is not repeated herein. The pressure sensor 704*b* includes a cylindrical body 710*a*. The cylindrical body 710*a* includes an intake face 726, a rear face 728, and a sidewall 730 extending therebetween. In the illustrated embodiment, the intake face 726 and the rear face 728 have similar diameters, although it will be appreciated that the intake face 726 can have a greater and/or lesser diameter than the rear face 728.

The intake face 726 defines a fluid interface 712a. The interface 712a includes a circular opening extending through the intake face 726 to an internal volume 722 of the pressure sensor 704b. The interface 712a can be positioned in any suitable location on the intake face 726. For example, in the illustrated embodiment, the interface 712a is offset on the intake face 726, although it will be appreciated that the interface 712a can be centered on the intake face 726 and is within the scope of this disclosure. In the illustrated embodiment, the interface 712a functions as an input/output and allows fluid flow into and out of the body 710a of the pressure sensor 704b. In other embodiments, an exhaust face 728 can define an output that provides a fluid flow path connected to the air conditioning system 610, 652 below the interface 712a.

In some embodiments, the interface 712a can serve as an attachment mechanism for coupling the pressure sensor 704b to a high-pressure and/or low-pressure side of an air conditioning system. For example, in the illustrated embodiment, the interface 712a includes an o-ring 720 configured to provide a fluid tight seal with an access valve of an air conditioning system (see, for example, FIGS. 10-11). The o-ring 720 maintains the body 710a in a fixed position and further provides a fluid-tight seal to prevent liquid coolant from escaping from the air conditioning system during monitoring and/or recharging operation.

Figure 15:
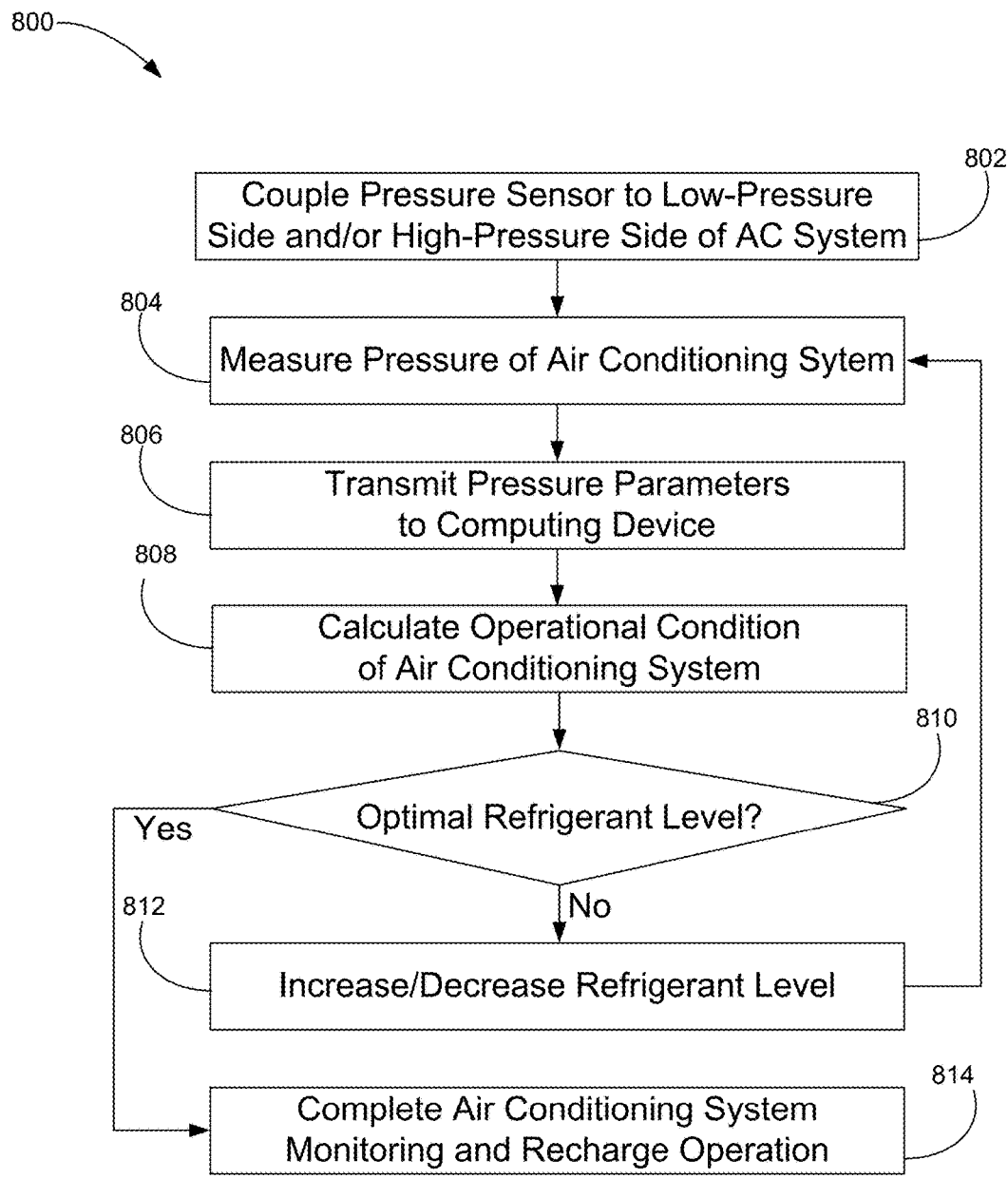
FIG. 15 illustrates a method of recharging an air conditioning system using the system of FIG. 12, in accordance with some embodiments.

FIG. 15 illustrates a method 800 of recharging an air conditioning system, such as the air conditioning systems 610, 652 illustrated in FIGS. 10-11, using a monitoring and recharge system, such as the system 602 discussed above, in accordance with some embodiments. At step 802, one or more pressure sensors 604a, 604b are coupled to a high-pressure side 610a, 652a and/or a low-pressure side 610b, 652b of the air conditioning system 610, 652. The pressure sensors 604a, 604b can be coupled to the respective high and/or low pressure sides using any suitable attachment mechanism, such as, for example, an o-ring and/or any other suitable attachment. The pressure sensors 604a, 604b are coupled to the respective pressure sides such that fluid flow from is directed towards and/or into fluid interface 712 formed in the respective pressure sensor 604a, 604b.

At step 804, the pressure sensors 604a, 604b each measure a pressure of a respective fluid flow (i.e., high-pressure/low-pressure) of the air conditioning system 610, 652. The pressure of the respective fluid flow is measured by a sensor unit 716 formed integrally with the pressure sensor 604a, 604b. The sensor unit 716 includes one or more sensors configured to measure the pressure of the fluid flow.

At step 806, the measured pressure is provided to the computing device 6. The measured pressure can be provided using any suitable communications system, such as, for example a wireless communication module 20a and/or wired communication module 20b. The measured pressure can be transmitted using any suitable protocol over any suitable medium, as discussed herein.

At step 808, the computing device 6 determines the current operational state of the air conditioning system 610, 652 such as the level of refrigerant in the air conditioning system 610, 652 and determines, at step 810, whether refrigerant should be added and/or removed from the air conditioning system 610, 652. The computing device 6 can utilize one or more algorithms, parameters and/or other functions to determine the level of refrigerant in the air conditioning system. For example, in some embodiments, a correlation between the high-pressure side pressure measurement and the low-pressure side pressure measurement can be used to determine the current level of refrigerant in the air conditioning system 610, 652, although it will be appreciated that additional and/or alternative measurements (such as only a high-pressure side and/or only a low-pressure side measurement) can be used to determine the current level of refrigerant in the air conditioning system 610, 652.

If the computing device 6 determines that the refrigerant level is not at optimal levels and that refrigerant should be added or removed from the air conditioning system 610, 652, the method 800 proceeds to step 812. If the computing device 6 determines the refrigerant level is at optimal levels, the method 800 proceeds to step 814. At step 812, refrigerant is added to and/or removed from the air conditioning system 610, 652. A flow controller 8 can be operated to add and/or remove the refrigerant. In some embodiments, the flow controller 8 is controlled by the computing device 6. For example, in some embodiments, the computing device 6 generates a signal based on the calculated current level of refrigerant in the air conditioning system 610, 652. If the current level of refrigerant is determined to be low, the flow controller 8 is operated to add refrigerant to the air conditioning system 610, 652. Similarly, if the current level of refrigerant is high, the flow controller 8 (and/or an alternative release valve) can be operated to remove refrigerant from the air conditioning system 610, 652.

The method 800 repeats steps 804-812 as necessary to obtain an optimal charge level of refrigerant within the air conditioning system 610, 652. When the computing device 6 determines that an optimal refrigerant level has been reached, the method 800 proceeds to step 814. At step 814, the recharge operation is completed. In some embodiments, the computing device 6 can generate an output indicative of the completed recharge operation and can indicate, for example, the amount of refrigerant added, the remaining refrigerant in a reservoir, the rate of loss of refrigerant over time, and/or any other suitable data. The data received and/or calculated by the computing device 6 can be provided to a remote server for storage, comparison, collation, and/or any other suitable use.

Figure 16:
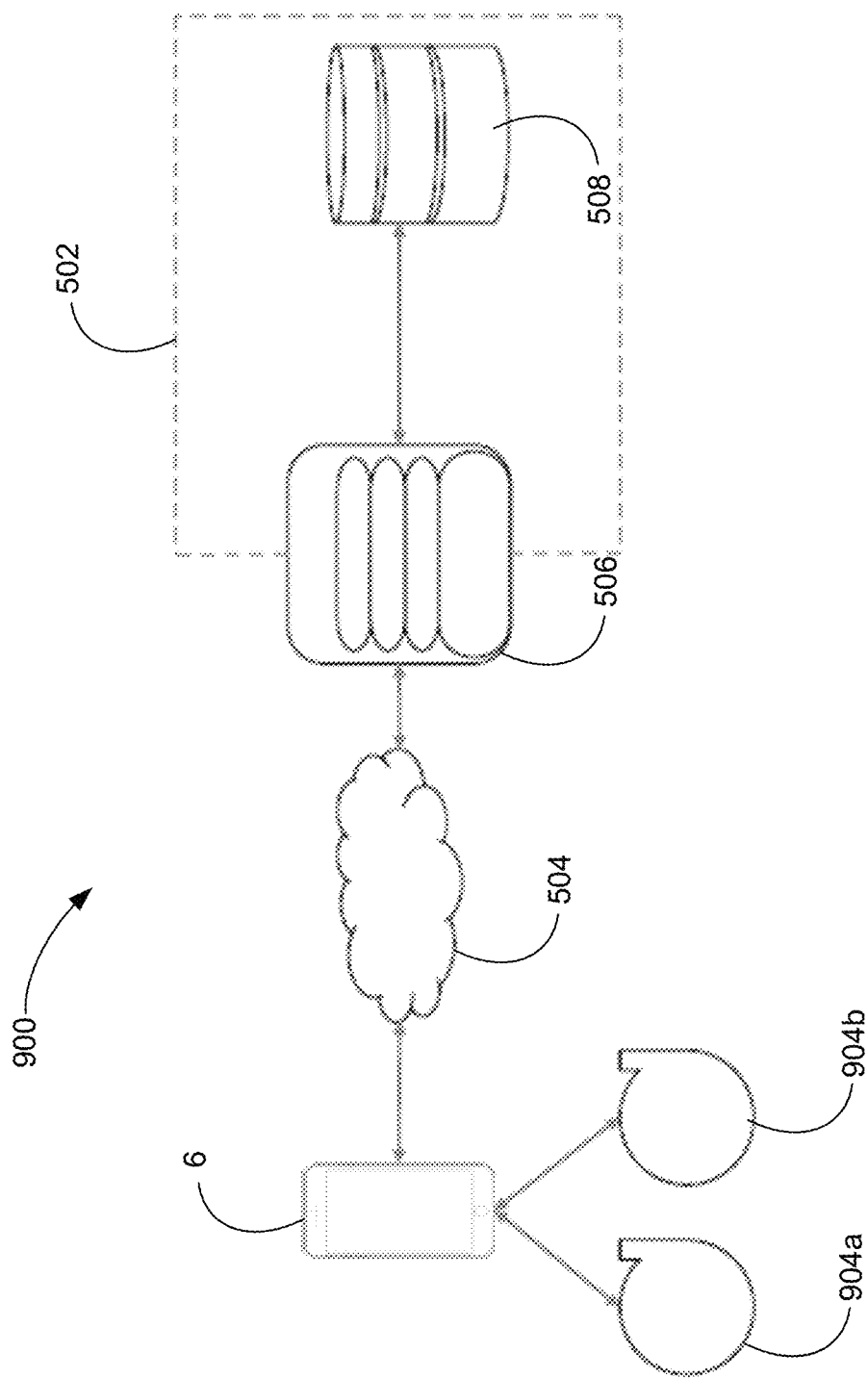
FIG. 16 illustrates a system for monitoring and recharging an air conditioning system including a remote server, in accordance with some embodiments.

FIG. 16 illustrates a system 900 for monitoring and recharging an air conditioning system, in accordance with some embodiments. The system 900 is similar to the system 500 discussed above and similar description is not repeated herein. The system 900 includes a plurality of sensors 904a, 904b. In some embodiments, the plurality of sensors 904a, 904b can include a first pressure sensor and a second pressure sensor (such as pressure sensor 604 discussed above). In some embodiments, the plurality of sensors 904a, 904b can include a first vent sensor (such as vent sensor 4 discussed above) and at least one pressure sensor (such as pressure sensor 604 discussed above). In some embodiments including both a vent sensor and a pressure sensor, the system 900 can utilize both air flow parameters (e.g., temperature, humidity, etc.) and pressure parameters to measure and/or optimize an air conditioning system, such as the air conditioning system 610, 652.

Figure 17:
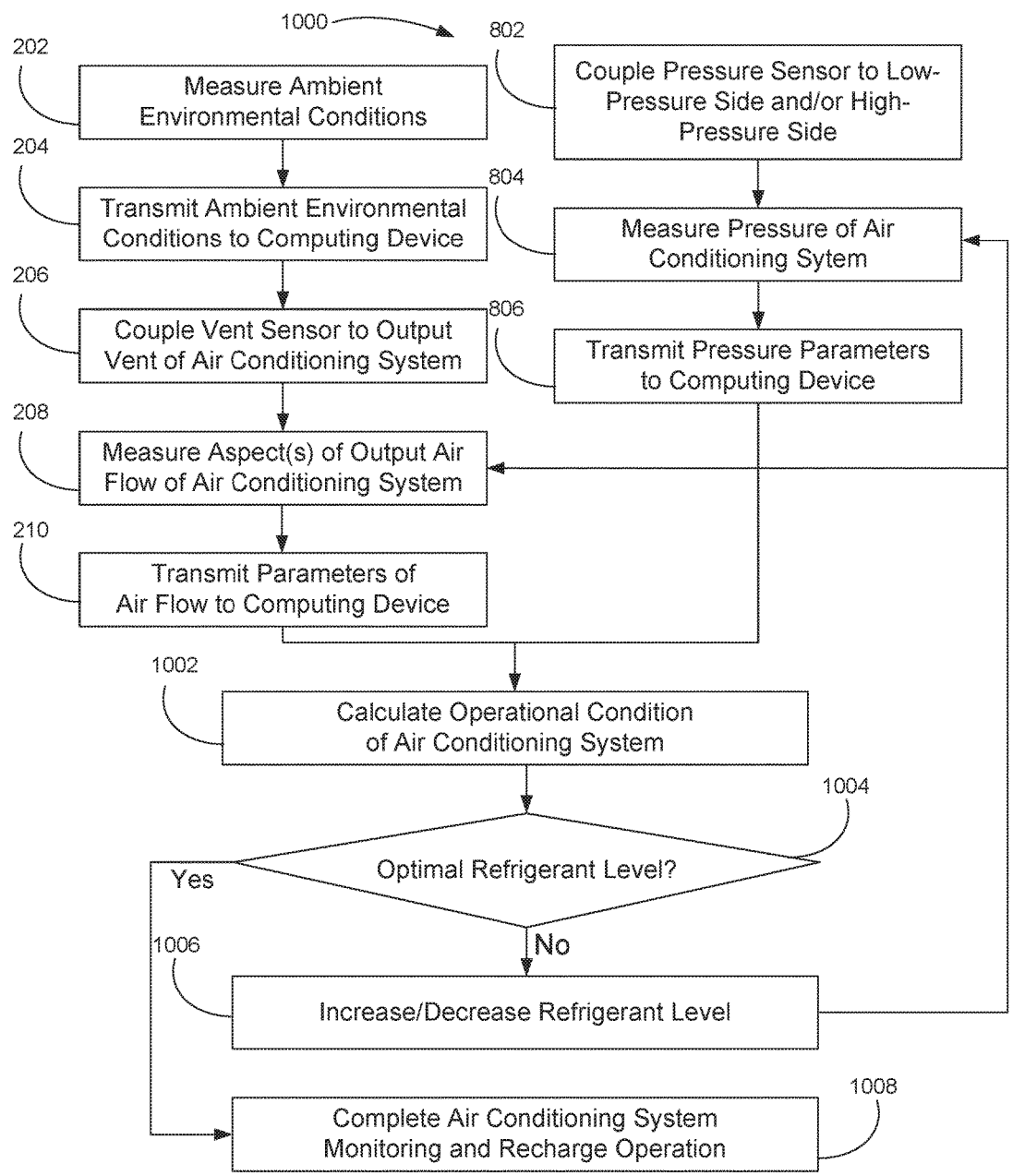
FIG. 17 illustrates a method of recharging an air conditioning system using a vent sensor and one or more pressure sensors, in accordance with some embodiments.

FIG. 17 illustrates a method 1000 of recharging an air conditioning system, such as the air conditioning systems 610 illustrated in FIG. 10 or the air conditioning system 652 illustrated in FIG. 11, using a monitoring and recharge system including one or more vent sensors, such as the vent sensor 4, and one or more pressure sensors, such as the pressure sensors 604a, 604b, in accordance with some embodiments. The method 1000 measures the ambient temperature and the parameters of the output air flow of the air conditioning system 610, 652 according to steps 202-210 of the method 200 discussed above. The method 1000 further measures the pressure of at least one of a high-pressure side and/or a low-pressure side of the air conditioning system 610, 652 according to the steps 802-806 of the method 800 discussed above.

At step 1002, the computing device 6 receives both the air flow parameters and the pressure measurements and determines the current operational state of the air conditioning system 610, 652 such as the level of refrigerant in the air conditioning system 610, 652 using at least one air flow parameters and the pressure measurement. For example, in some embodiments, the computing device 6 can be configured to compare an output temperature of the air conditioning system 610, 652, an ambient temperature of the environment, and one of a low-pressure and/or high-pressure measurement of the air conditioning system 610, 652 to determine the current operational condition of the air conditioning system 610, 652, although it will be appreciated that any combination of air flow parameters (including ambient parameters or output air flow parameters) and/or pressure measurements (including low-side pressure and/or high-side pressure) can be utilized by the computing device 6 to determine the current operational condition of the air conditioning system 610, 652.

At step 1004, the computing device 6 determines whether refrigerant should be added and/or removed from the air conditioning system 610, 652. The computing device 6 can utilize one or more algorithms, parameters and/or other functions to determine the level of refrigerant in the air conditioning system. If the computing device 6 determines the air conditioning system 610, 652 is not at optimal levels, the method 1000 proceeds to step 1006. If the computing device 6 determines the air conditioning system 610, 652 is at optimal levels, the method 1000 proceeds to step 108.

At step 1006, refrigerant is added to and/or removed from the air conditioning system 610, 652. A flow controller 8 can be operated to add and/or remove the refrigerant. In some embodiments, the flow controller 8 is controlled by the computing device 6. For example, in some embodiments, the computing device 6 generates a signal based on the calculated current level of refrigerant in the air conditioning system 610, 652. If the current level of refrigerant is determined to be low, the flow controller 8 is operated to add refrigerant to the air conditioning system 610, 652. Similarly, if the current level of refrigerant is high, the flow controller 8 (and/or an alternative release valve) can be operated to remove refrigerant from the air conditioning system 610, 652.

The method 1000 repeats steps 208-210, 804-806, and 1002-1006 as necessary to obtain an optimal charge level of refrigerant within the air conditioning system 610, 652. When the computing device 6 determines that an optimal refrigerant level has been reached, the method 1000 proceeds to step 1008. At step 1008, the recharge operation is completed. In some embodiments, the computing device 6 can generate an output indicative of the completed recharge operation and can indicate, for example, the amount of refrigerant added, the remaining refrigerant in a reservoir, the rate of loss of refrigerant over time, and/or any other suitable data. The data received and/or calculated by the computing device 6 can be provided to a remote server for storage, comparison, collation, and/or any other suitable use Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
   a vent sensor configured to be coupled to an output vent of an air conditioning system, the vent sensor configured to measure a temperature of an air flow from the output vent, wherein the vent sensor is configured to transmit the temperature of the air flow from the output vent wirelessly;
   a pressure sensor configured to be coupled to a refrigerant flow path of the air conditioning system, wherein the pressure sensor is configured to measure a pressure of refrigerant in the refrigerant flow path, wherein the pressure sensor is configured to transmit the pressure of the refrigerant wirelessly; and
   a processor in signal communication with the vent sensor, wherein the processor is configured to receive the temperature of the air flow, the pressure of refrigerant, and at least one ambient environmental parameter, and wherein the processor is configured to determine a current refrigerant charge level of the air conditioning system based on a predetermined relationship between the temperature of the air flow, the pressure of the refrigerant, and the at least one ambient environmental parameter, and wherein the current refrigerant charge level is one of an over-charge level, an under-charge level, or an optimal-charge level.

2. The system of claim 1, comprising:
   a flow controller in signal communication with the processor and configured to be coupled to a refrigerant reservoir, wherein the flow controller is configured to add refrigerant to the refrigerant reservoir when the current refrigerant level is at the under-charge level and remove refrigerant from the refrigerant reservoir when the current refrigerant level is at the over-charge level.

3. The system of claim 2, wherein the flow controller comprises a two-way valve.

4. The system of claim 1, wherein the vent sensor comprises:
   a body defining an inlet;
   an attachment mechanism coupled to an outer surface of the body, the attachment mechanism configured to couple the body to the output vent of the air conditioning system; and
   a sensor unit positioned within the body and in fluid communication with the inlet, wherein the sensor unit is configured to receive the air flow from the output vent through the inlet and measure the temperature of the air flow.

5. The system of claim 4, wherein the attachment mechanism comprises a clip.

6. The system of claim 4, wherein the body defines an exhaust, and wherein the exhaust is in fluid communication with the inlet.

7. The system of claim 4, wherein the vent sensor is configured to measure the at least one ambient environmental parameter, wherein the communication module is configured to transmit the at least one ambient environmental parameter from the vent sensor to the processor.

8. The system of claim 1, wherein the vent sensor comprises a temperature sensor.

9. The system of claim 1, wherein the vent sensor comprises a humidity sensor.

10. A system, comprising:
    a vent sensor, comprising:
    a body defining an inlet;

an attachment mechanism coupled to an outer surface of the body, the attachment mechanism configured to couple the body to an output vent of an air conditioning system; and an air flow sensor unit positioned within the body and in fluid communication with the inlet, wherein the air flow sensor unit is configured to receive an air flow from the output vent through the inlet and measure a temperature of the air flow; and a first communication module in signal communication with the air flow sensor unit, wherein the first communication module is configured to wirelessly transmit the temperature of the air flow;

a pressure sensor, comprising:

a cylindrical body defining a fluid interface configured to receive refrigerant from one of a high-pressure side or a low-pressure side of an air conditioning system;

a pressure sensor unit positioned within the cylindrical body and in fluid communication with the fluid interface, wherein the pressure sensor unit is configured to receive the refrigerant from the one of the high-pressure side or the low-pressure side and measure a pressure of the refrigerant; and a second communication module in signal communication with the pressure sensor unit, wherein the second communication module is configured to wirelessly transmit the pressure of the refrigerant; and a processor configured to receive the temperature of the air flow, the pressure of the refrigerant, and at least one ambient environmental parameter, and wherein the processor is configured to determine a current refrigerant charge level of the air conditioning system based on a predetermined relationship between the temperature of the air flow, the pressure of the refrigerant, and the at least one ambient environmental parameter, and wherein the current refrigerant charge level is one of an over-charge level, an under-charge level, or an optimal-charge level.

11. The system of claim 10, wherein the attachment mechanism of the vent sensor comprises a clip.

12. The system of claim 10, wherein the body of the vent sensor defines an exhaust, and wherein the exhaust is in fluid communication with the inlet.

13. The system of claim 10, comprising a third communication module in signal communication with the processor, wherein the third communication module is configured to receive the temperature of the air flow from the air flow sensor unit and the pressure of the refrigerant from the pressure sensor unit.

14. The system of claim 10, wherein the air flow sensor unit comprises a temperature sensor.

15. The system of claim 10, wherein the air flow sensor unit comprises a humidity sensor.

16. A method, comprising:

measuring at least one ambient environmental parameter;

measuring, by a vent sensor, a temperature of an output air flow of an air conditioning system, wherein the vent sensor comprises a body defining an inlet, an attachment mechanism coupled to an outer surface of the body, the attachment mechanism configured to couple the body to an output vent of an air conditioning system, a sensor unit positioned within the body and in fluid communication with the inlet, wherein the sensor unit is configured to receive the output air flow from the outlet vent through the inlet and measure the temperature of the air flow, and a first communication module in signal communication with the sensor unit, wherein the first communication module is configured to wirelessly transmit the temperature of the output air flow to a remote processor;

measuring, by a pressure sensor, a pressure of refrigerant in a refrigerant flow path, wherein the pressure sensor comprises a second communication module configured to wirelessly transmit the pressure of the refrigerant to the remote processor; and determining, by a processor, a current refrigerant charge state of the air conditioning system based a predetermined relationship between the temperature of the air flow, the pressure of refrigerant, and the at least one ambient environmental parameter, wherein the current refrigerant charge state is one of an over-charge state, an under-charge state, or an optimal charge state.

17. The method of claim 16, comprising:

modifying, by a flow controller, a refrigerant level of a refrigerant reservoir of the air conditioning system when the processor determines the current refrigerant charge state of the air conditioning system is not at the optimal state, wherein the refrigerant level is increased when the current refrigerant charge state is the under-charge state and the refrigerant level is decreased when the current refrigerant charge state is the over-charge state.

18. The method of claim 16, wherein the at least one ambient environmental parameter comprises an ambient temperature and a relative humidity.

* * * * *